(12) United States Patent
Pirim

(10) Patent No.: US 7,212,669 B2
(45) Date of Patent: *May 1, 2007

(54) AUTOMATIC PERCEPTION METHOD AND DEVICE

(75) Inventor: Patrick Pirim, Paris (FR)

(73) Assignee: William J. Brown, Esq., Miami, FL (US), Trustee for Joesph D. Harbaugh ( * ) Notice: Subject to any disclaimer, the term of this patent is extended or adjusted under 35 U.S.C. 154(b) by 618 days.

This patent is subject to a terminal disclaimer.

(21) Appl. No.: 10/204,825

(22) PCT Filed: Feb. 23, 2001

(86) PCT No.: PCT/FR01/00546

§ 371 (c)(1),
(2), (4) Date: Feb. 10, 2003

(87) PCT Pub. No.: WO01/63557

PCT Pub. Date: Aug. 30, 2001

(65) Prior Publication Data

US 2003/0152267 A1 Aug. 14, 2003

(30) Foreign Application Priority Data

Feb. 24, 2000 (FR) .................................. 00 02355

(51) Int. Cl.
*G06K 9/00* (2006.01)
(52) U.S. Cl. .................................................... 382/170
(58) Field of Classification Search ................. 382/170
See application file for complete search history.

(56) References Cited

U.S. PATENT DOCUMENTS

| 4,783,828 | A | | 11/1988 | Sadjadi |
| 5,008,946 | A | | 4/1991 | Ando |
| 5,088,488 | A | | 2/1992 | Markowitz et al. |
| 5,109,425 | A | | 4/1992 | Lawton |
| 5,163,095 | A | | 11/1992 | Kosaka |
| 5,278,921 | A | | 1/1994 | Nakamura et al. |
| 5,359,533 | A | * | 10/1994 | Ricka et al. ................. 702/78 |
| 5,384,865 | A | | 1/1995 | Loveridge |
| 5,488,430 | A | | 1/1996 | Hong |
| 5,565,920 | A | | 10/1996 | Lee et al. |

(Continued)

FOREIGN PATENT DOCUMENTS

EP 0 046 110 A1 2/1982

(Continued)

OTHER PUBLICATIONS

Stephane G. Mallat, "A Theory for Multiresolution Signal Decomposition: The Wavelet Representation", IEEE Transactions on Pattern Analysis and Machine Intelligence, vol. 11, No. 7, Jul. 1989, pp. 674-693.

(Continued)

*Primary Examiner*—Wenpeng Chen
*Assistant Examiner*—Yuzhen Ge
(74) *Attorney, Agent, or Firm*—Malloy & Malloy, P.A.

(57) ABSTRACT

The invention concerns a method and a device for the automatic perception of an event. Said device comprises a control unit, a data bus, a back-annotation bus and at least a histogram computing unit.

25 Claims, 28 Drawing Sheets

ART ANTERIEUR

U.S. PATENT DOCUMENTS

| | | | |
|---|---|---|---|
| 5,592,226 A | 1/1997 | Lee et al. | |
| 5,592,237 A | 1/1997 | Greenway et al. | |
| 5,619,347 A * | 4/1997 | Taniguchi et al. | 358/516 |
| 5,625,717 A | 4/1997 | Hashimoto et al. | |
| 5,694,495 A | 12/1997 | Hara et al. | |
| 5,712,729 A | 1/1998 | Hashimoto | |
| 5,774,581 A | 6/1998 | Fassnacht et al. | |
| 5,793,888 A | 8/1998 | Delanoy | |
| 6,256,608 B1 | 6/2001 | Malvar | |
| 6,304,187 B1 | 10/2001 | Pirim | |
| 6,393,054 B1 * | 5/2002 | Altunbasak et al. | 375/240 |
| 6,473,095 B1 * | 10/2002 | Martino et al. | 715/726 |
| 6,486,909 B1 | 11/2002 | Pirim | |
| 6,597,738 B1 | 7/2003 | Park et al. | |
| 6,717,518 B1 | 4/2004 | Pirim | |
| 6,774,629 B2 * | 8/2004 | Miyoshi | 324/309 |
| 2002/0071595 A1 | 6/2002 | Pirim | |
| 2002/0101432 A1 | 8/2002 | Ohara et al. | |
| 2002/0120594 A1 | 8/2002 | Pirim | |
| 2002/0156753 A1 | 10/2002 | Pirim | |
| 2002/0169732 A1 | 11/2002 | Pirim | |
| 2003/0067978 A1 | 4/2003 | Pirim | |

FOREIGN PATENT DOCUMENTS

| | | |
|---|---|---|
| EP | 0 380 659 A1 | 8/1990 |
| EP | 0 394 959 A2 | 10/1990 |
| FR | 2 611 063 B1 | 8/1988 |
| FR | 2 751 772 A1 | 1/1998 |
| JP | 06-205780 A | 7/1994 |
| WO | WO 98/05002 A1 | 2/1998 |
| WO | WO 99/36893 | 7/1999 |
| WO | WO 99/36894 | 7/1999 |
| WO | WO 00/11609 A1 | 3/2000 |
| WO | WO 00/11610 A1 | 3/2000 |
| WO | WO 01/63557 A2 | 8/2001 |

OTHER PUBLICATIONS

John G. Daugman, "Complete Discrete 2-D Gabor Transforms by Neural Networks for Image Analysis and Compression", IEEE Transaction on Acoustics, Speech and Signal Processing, vol. 36, No. 7, Jul. 1988, pp. 1169-1179.

Alberto Tomita, Jr., et al., "Hand Shape Extraction from a Sequence of Digitized Gray-Scale Images", IECON '94, 20th International Conference on Industrial Electronics, Control and Instrumentation, vol. 3 of 3, Special Sessions, Signal Processing and Control, pp. 1925-1930.

Giacomo Indiveri et al., "System Implementations of Analog VLSI Velocity Sensors", 1996 IEEE Proceedings of MicroNeuro '96, pp. 15-22.

Pierre-Francois Rüedi, "Motion Detection Silicon Retina Based on Event Correlations", 1996 IEEE Proceedings of MicroNeuro '96, pp. 23-29.

Revue Trimestrielle Des <<Techniques de Lingenieur>>, "Instantanés Technique" Techniques De L'ingénieur, Mars 1997-N°5 (40F), ISSN 0994-0758.

Es Professionnels de Linformatique En Entreprise Magazine, "Objectif Securite Des Reseaux", N° 24, Jan. 1997.

Electroncique International Hebdo, Dec. 5, 1996-N° 245, "Premier . . . L'oeil", Francoise Gru svelet (with translation).

Nabeel AJ Adsani, "For Immediate Release The Generic Visual Perception Processor", Oct. 10, 1997, p. 1.

Colin Johnson, "Vision Chip's Circuitry Has Its Eye Out For You", http://192.215.107.74/wire/news/1997/09/0913vision.html, pp. 1-3.

The Japan Times,:"British firm has eye on the future", Business & Technology, Tuesday, Nov. 18, 1997, 4th Edition.

Inside the Pentagon's, Inside Missile Defense, an exclusive biweekly report on U.S. missile defense programs, procurement and policymaking, "Missile Technology" vol. 3, No. 16-Aug. 13, 1997, p. 5.

Electronique, "Le Mechanisme de la Vision Humaine Dans Le Silicium", Electronique Le Mensuel Des Ingenieurs De Conception, No. 68, Mars 1997, ISSN 1157-1151 (with translation).

"Elecktronik Revue" ER, Eine Elsevier-Thomas-Publikation, Jahrgang 8, Marz 1997, NR.3, ISSN0939-1134.

"Un Processor de Perception Visuelle", LehAUT pARLEUR, 25F Des solutions électroniques pour tous, N° 1856, Jan. 15, 1997 (with translation).

"Realiser Un Decodeur Pour TV Numberique", Electronique, Le Mensuel Des Ingenieurs De Conception, No. 66, Jan. 1997.

Groupe Revenu Francais, Air & Cosmos Aviation International, "Un Calculateur De Perceoption Visuelle", Hebdomadaire, vendredi Dec. 6, 1996, 34 Année, No. 1590, 22F.

Kenichi Yamada, et al; "Image Understanding Based on Edge Histogram Method for Rear-End Collision Avoidance System", Vehicle Navigation & Information Systems Conference Proceedings; (1994), pp. 445 450 published Aug. 31, 1994; XP 000641348.

* cited by examiner

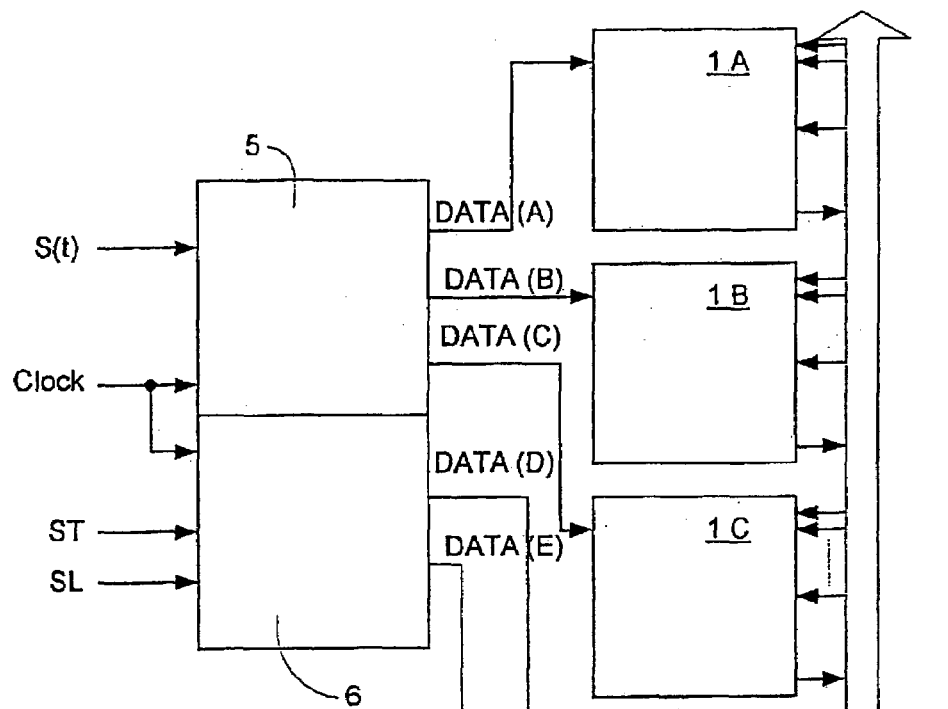
FIG. 30
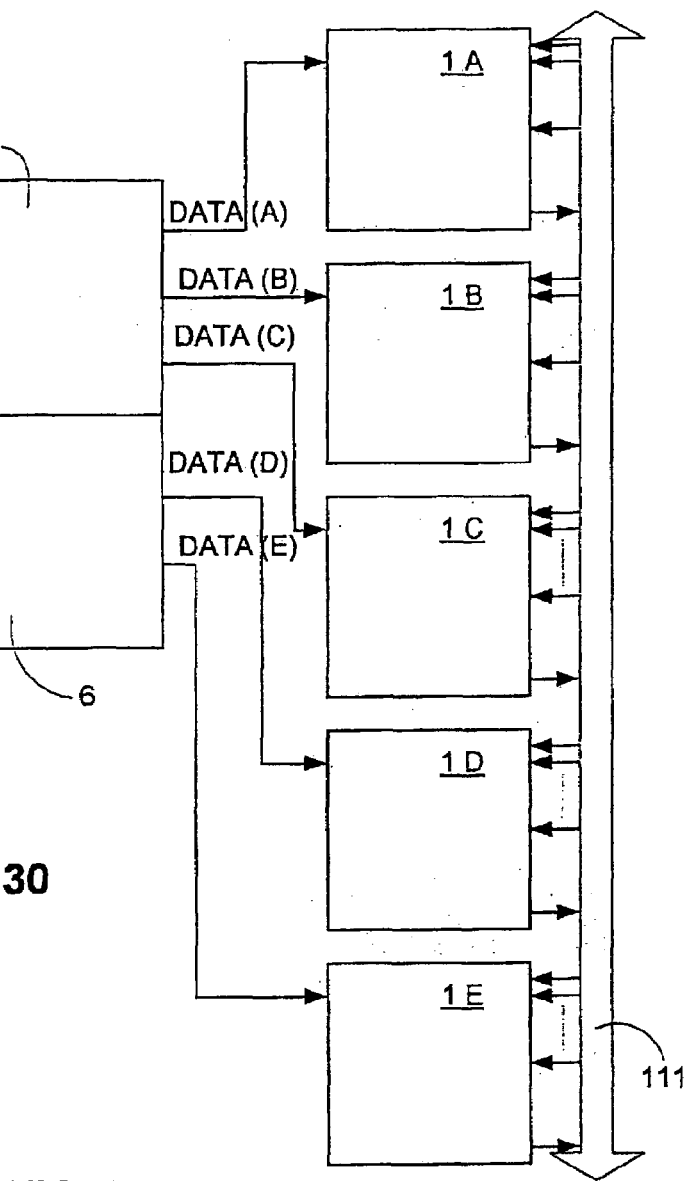
FIG. 31
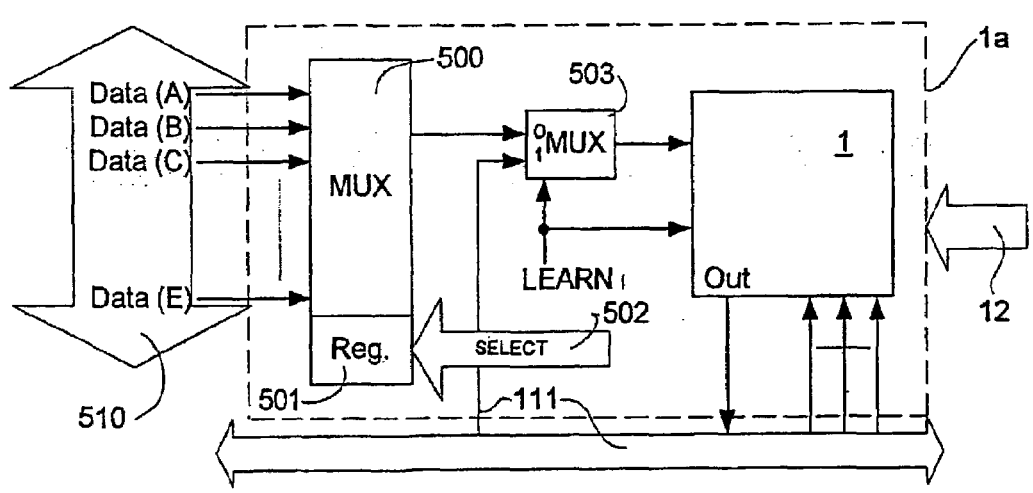

AUTOMATIC PERCEPTION METHOD AND DEVICE

The invention relates to a method and a device for automatic visual perception. The device comprises a histogram calculation unit, also called electronic spatio-temporal neuron, preferably a self-adapting histogram calculation unit, capable of implementing anticipation and learning modes. Such devices are more particularly intended for image perception and processing.

Image processing methods and devices are already known, which enable real-time recognition, localization and/or extraction of objects corresponding to certain criteria of their context.

The selection criteria can be extremely varied. They may be related to speed, shape, color . . . or a combination of these criteria.

These methods and devices can be used to facilitate the acquisition of a scene or of a phenomenon by an observer or to control an automatism on the basis of information thus extracted.

Such methods and devices are for example described in the following publications FR-2.611063 and WO-98/05002.

Certain of these methods and devices implement a spatial and temporal processing unit that, upon receiving a video-type signal S(PI), produces a number of parameters for each pixel. It may be, for instance speed V, direction DL, a time constant CO and a binary enabling parameter VL in addition to the delayed video signal VR and the different frame, line and pixel synchronization signals gathered under the denomination F.

In such devices, the importance of constituting histograms of these parameters has already been outlined in order to acquire, manipulate and process statistical information.

The purpose of such image processing methods and devices includes outputting a signal S'(t) that carries for each pixel a significant piece of information of the result obtained when applying recognition or selection criteria. These criteria are predefined or prepared by the image processing methods and devices properly speaking.

Such a method and such a device, in particular, are disclosed in the patent application WO-98/05002, already mentioned, that has been integrated thereto for reference purposes.

The purpose of the invention is to provide a quick and efficient automatic perception method and device and to improve for such a device, the histogram acquisition units while performing self-adapting, and in preferred embodiments, anticipation and learning functions.

This invention therefore provides an automatic visual perception device for detecting an event occurring in a space with respect to at least one parameter.

According to the invention, this device comprises a control unit, a data bus, a time coincidences bus and at least one histogram calculation unit for processing the parameter.

The present invention also covers the features that will be put in evidence by the following description and that will have to be considered either independently or in all their possible technical combinations:

the device comprises, in order to process several parameters, several histogram calculation units organized into a matrix;

the histogram calculation units process data $a_{ijt}$ associated with pixels forming together a multidimensional space evolving with the course of time and represented at a succession of instants, wherein said data reaches said calculation unit in the form of a digital signal DATA(A) in the form of a succession $a_{ijt}$ of binary number of n bits associated with synchronization signals enabling to define the given instant of the space and the position of the pixel in this space, to which the signal $a_{ijt}$ received at a given instant is associated, and comprises:

an analysis memory comprising a memory with addresses, each associated with possible values of the numbers of n bits of the signal DATA(A) and whereof the writing process is controlled by a signal <<WRITE>>, a classifier comprising a memory intended for receiving a selection criterion C of the parameter DATA(A), receiving the signal DATA(A) at input and which outputs a binary classification signal whereof the value depends on the result of the comparison of the signal DATA(A) with the selection criterion C, a time coincidences unit receiving the output signal from the classifier and, from outside the histogram calculation unit, individual binary classification signals affecting parameters other than DATA(A), wherein said time coincidences unit outputs a positive global enabling signal when all the individual time coincidences signals are valid, a test unit, an analysis output unit, an address multiplexer, an incrementation enabling unit, wherein the counter of each address in the memory corresponds to the value d of $a_{ijt}$ at a given instant, which is incremented by one unit when the time coincidences unit outputs a positive global enabling signal, the unit intended for calculating and storing statistical data processes, after receiving the data $a_{ijt}$ corresponding to the space at a given instant, the content of the memory in order to update the analysis output unit, the memory is erased before the beginning of each frame for a space at a given instant by an initialization signal <<INIT>>, and, moreover:

the memory of the classifier is an addressable memory enabling real time updating of the selection criterion C and having one data input DATA IN, an address command ADDRESS and a writing command WR, receiving on its input the output from the analysis memory and a signal END on its writing command, the histogram processing units also comprise a data input multiplexer with two inputs and one output, receiving on one of its inputs a counting signal COUNTER and on its other input the succession of data $a_{ijt}$, outputting succession of data $a_{ijt}$ to the address command of the memory of the classifier and an operator OR controlling the address multiplexer and receiving on its inputs an initialization signal INIT and the end signal END;

the space is two-dimensional and the signal DATA(A) is associated with the pixels of a succession of images.

the histogram processing units comprise means for anticipating the value of the classification criterion;

the means for anticipating the value of the classification criterion comprise memories intended for containing the values of statistical parameters relating to two successive frames;

the statistical parameters are the average values of the data $a_{ijt}$ enabled;

the analysis output register of the histogram calculation units constitutes and stores in its memory at least one of the following values: the minimum 'MIN', the maximum 'MAX', the maximum number of pixels for which the signal $V_{ijt}$ has a particular value 'RMAX', the particular value corresponding POSRMAX, the total number of enabled pixels 'NBPTS';

the statistical comparison parameter used by the classifier is RMAX/2;

it comprises a controlled multiplexer, capable of receiving at input several statistical parameters and the nature of the comparison made by the classifier depends on the command of said multiplexer;

certain histogram calculation units, at least, comprise a learning multiplexer intended for receiving an external command signal and producing an operation according to a learning mode wherein the registers of the classifier and of the time coincidences unit are deleted when starting to process a frame and the analysis output register supplies values typical of the sequence of each of these registers;

in certain histogram calculation units, at least, the memory of the classifier includes a set of independent registers, each comprising one input, one output and one writing command, wherein the number of these registers is equal to the number n of bits of the numbers of the succession $V_{ijt}$ and it comprises a decoder enabling to output a writing command signal corresponding to the related input value (address) and a multiplexer controlled by this input value, thus enabling to read the chosen register;

certain histogram calculation units, at least, comprise multiplexers, one of them being associated with the input of each register and combinatory modules connecting the registers to one another, wherein said multiplexers enable to choose between sequential writing and a writing mode common to all the registers connected together by the combinatory modules.

in certain histogram calculation units, at least, the combinatory modules comprise a morphological expansion operator including a three-input logic unit 'OR', whereof the first input receives the output signal of the 'Q'-order register, the second is connected to the output of a two-input logic unit 'AND' receiving respectively the output signal of the 'Q+1'-order register and a positive erosion signal, the third is connected to the output of a two-input logic unit 'AND' receiving respectively the output signal of the 'Q−1'-order register and a negative expansion signal;

in certain histogram calculation units, at least, the combinatory modules comprise a morphological erosion operator including a three-input logic unit 'AND', whereof the first input receives the output signal of the 'Q'-order register, the second is connected to the output of a logic unit 'AND', whereof one four-input reverse receives respectively the output signal of the 'Q'-order register, the output signal of the 'Q−1'-order register, the output signal of the 'Q+1'-order register and a positive erosion signal, the third is connected to the output of a four-input logic unit 'AND', whereof one reverse receives respectively the output signal of the 'Q'-order register, the output signal of the 'Q−1'-order register, the output signal of the 'Q+1'-order register and a negative erosion signal in certain histogram calculation units, at least, each combinatory module comprises a multiplexer associating a morphological expansion operator and a morphological erosion operator.

The invention relates to an automatic visual perception method of an event occurring in a space with respect to at least one parameter, consisting in digitalizing the parameter and inputting it to a histogram calculation unit in order to obtain a histogram representative of the parameter and to derive the result desired.

The invention also relates to an analysis method of a parameter representative of an event in an electronic device comprising a histogram calculation over data $a_{ijt}$ associated with pixels forming together a multidimensional space evolving with the course of time and represented at a succession of instants, wherein said data reaches said calculation unit in the form of a digital signal DATA(A) in the form of a succession $a_{ijt}$ of binary number of n bits associated with synchronization signals enabling to define the given instant of the space and the position of the pixel in this space, to which the signal $a_{ijt}$ received at a given instant is associated, wherein:

to each data $a_{ijt}$ is associated a classification binary signal whereof the value depends on the result of the comparison between the signal DATA(A) and the selection criterion C, a statistical distribution of the data $a_{ijt}$ is made for a given instant for which a global enabling signal is positive, said global enabling signal being made of a set of individual time coincidences signals, each one corresponding to a parameter DATA(A), DATA(B), . . . , DATA(E), resulting from the comparison between a time coincidences criterion R and the classification signal and being positive.

The invention will be described more in detail with reference to the appended drawings wherein:

FIG. 30 is the representation of the implementation of a plurality of histogram calculation units;

FIG. 31 is the representation of the use of a single programmable histogram calculation unit with a multiplexer enabling the calculation unit to process a plurality of parameters;

Figure 39:
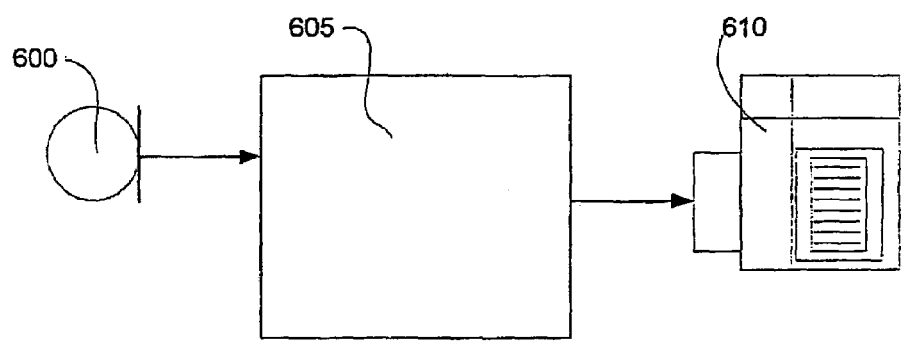
Figure 32:
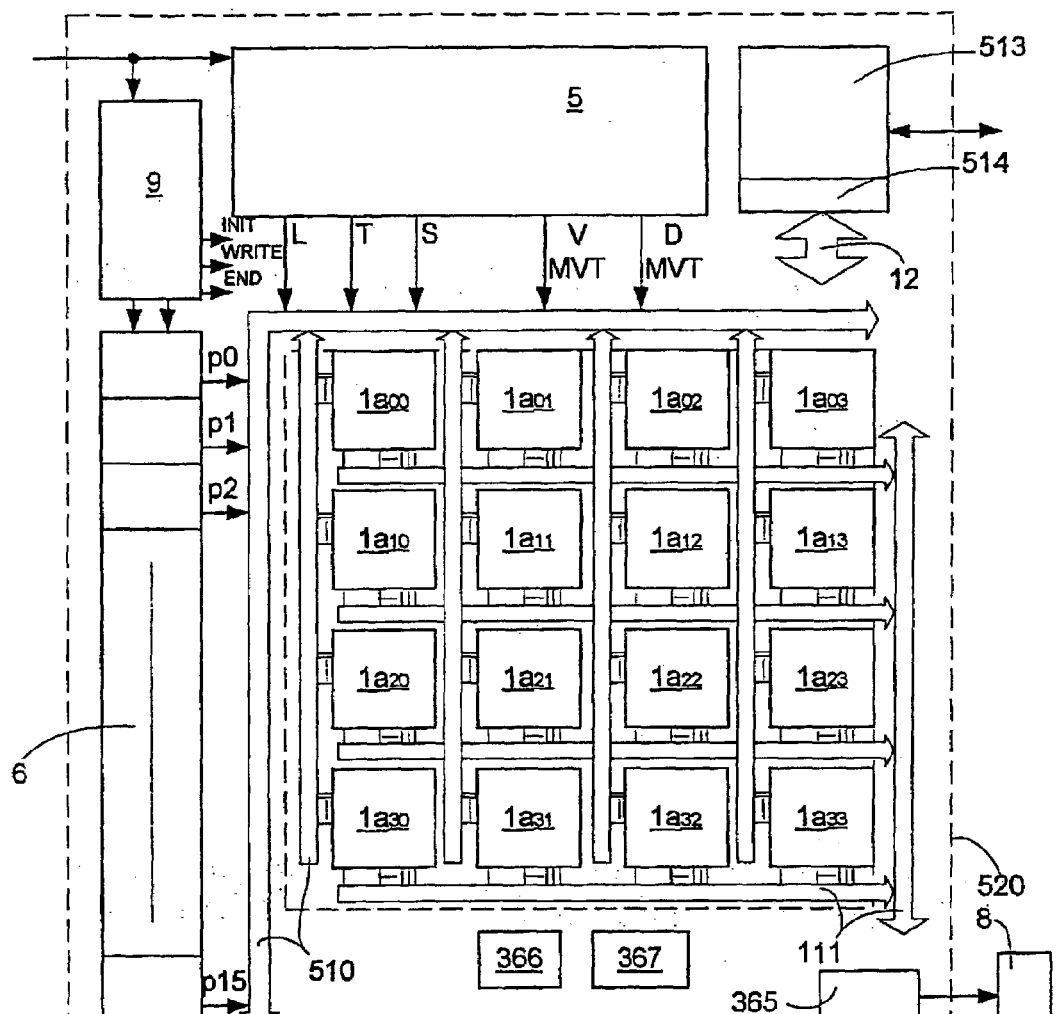
FIG. 32 represents a set of histogram calculation units with programmable input control in their context of usage thereby constituting a functional entity.
Figure 33:
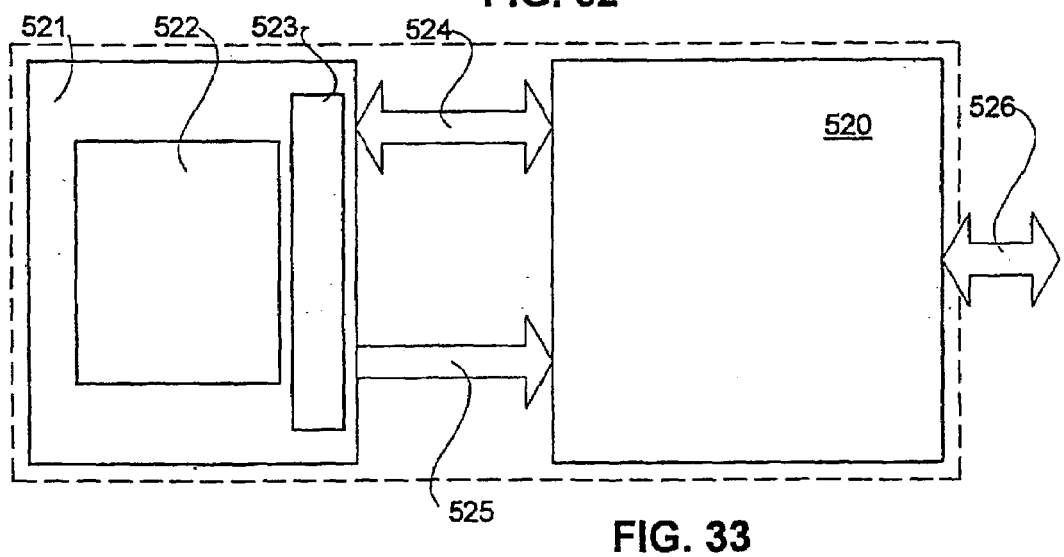
FIG. 33 is a synthetic representation of a functional unit with the associated signal generator.
Figure 34:
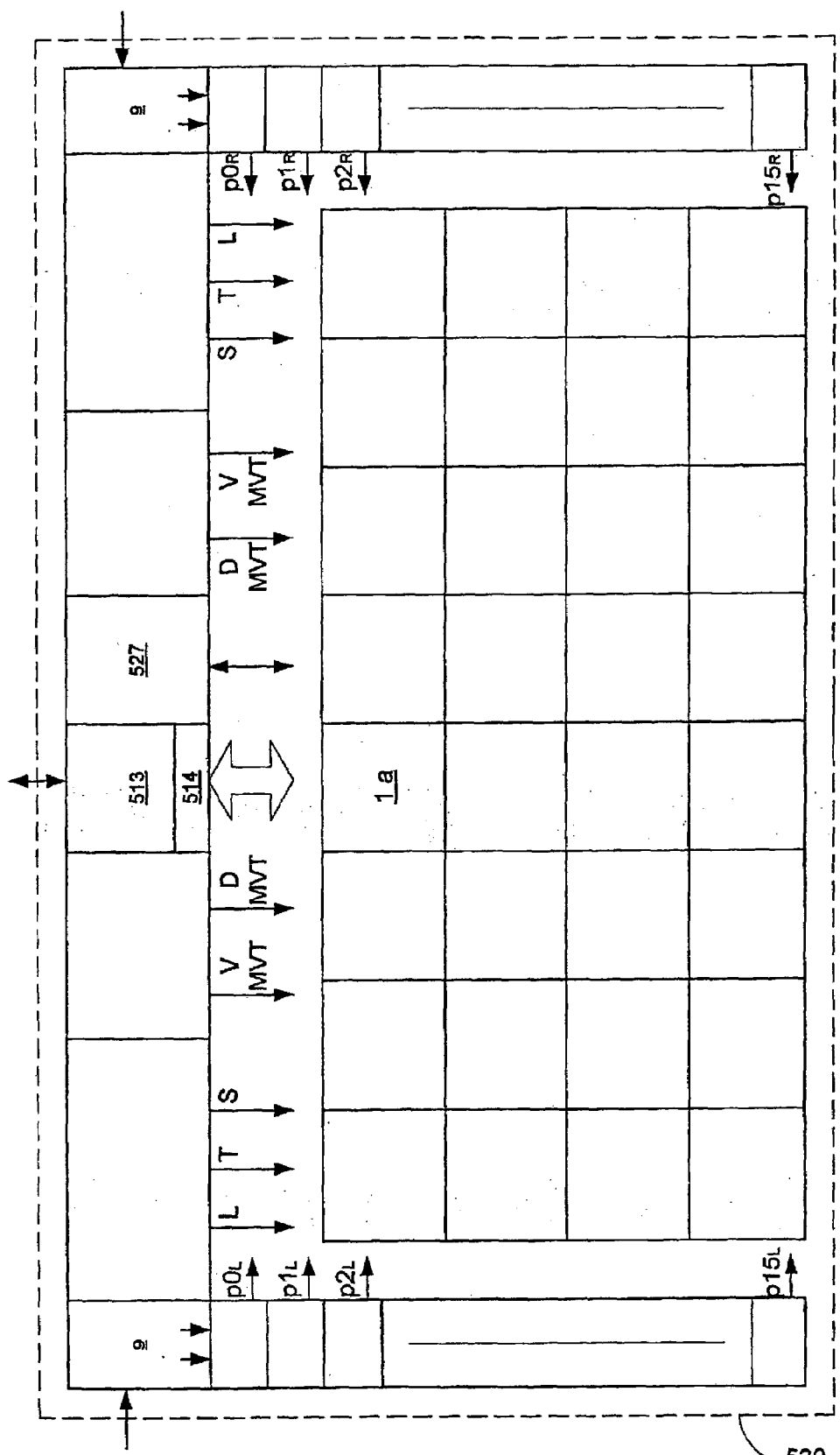
Figure 35:
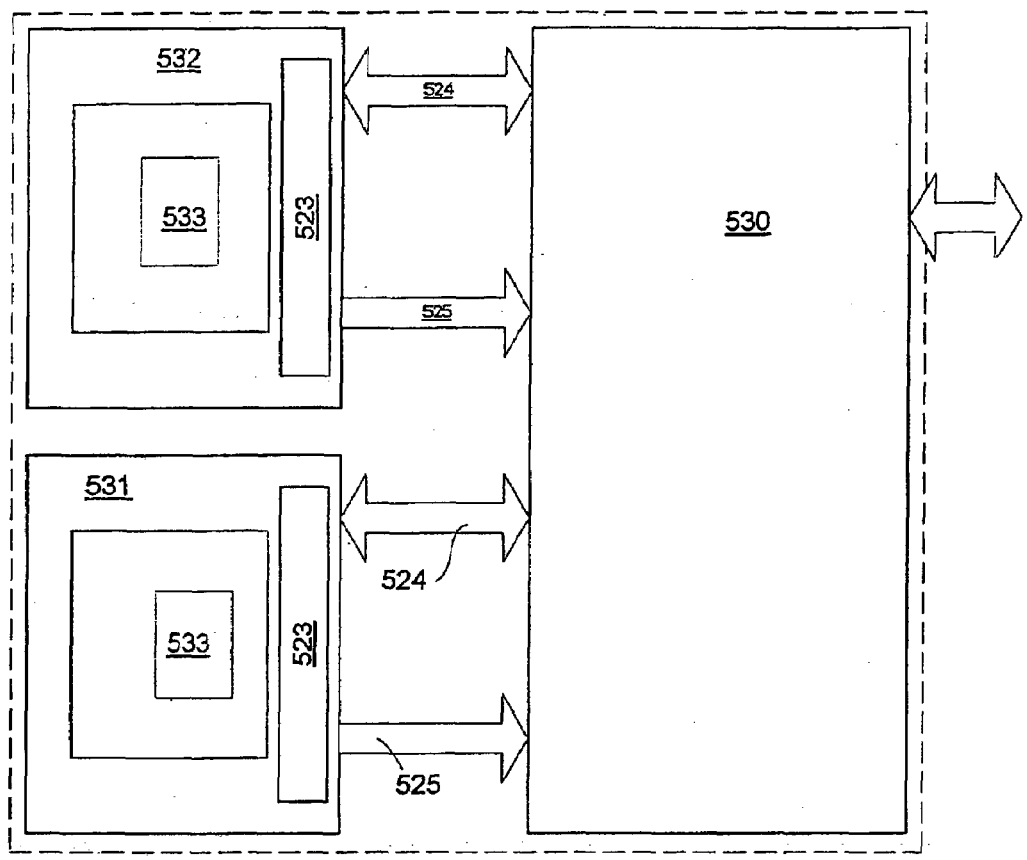
Figure 36:
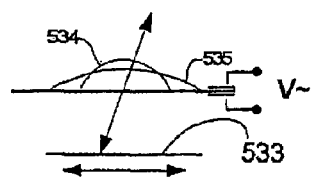
Figure 37:
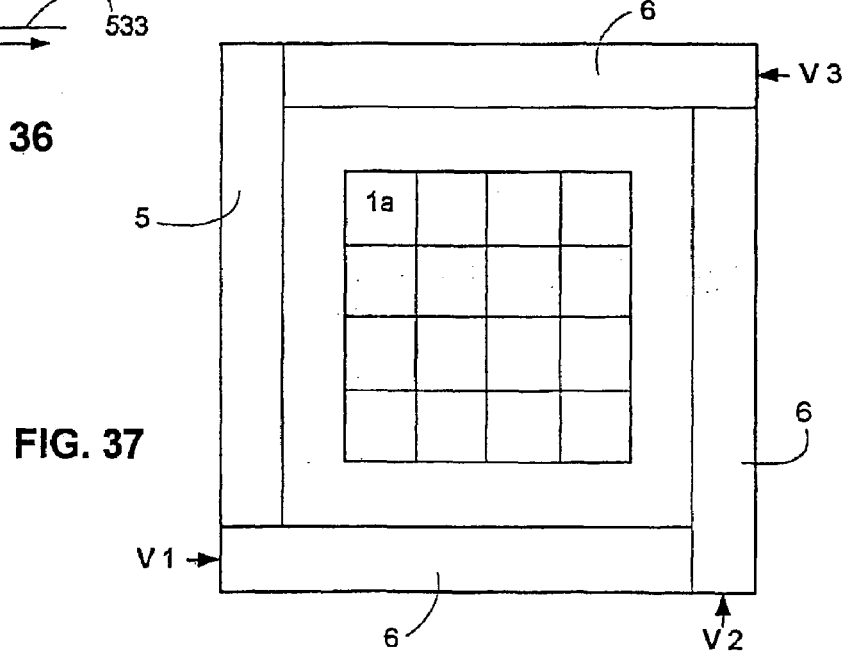
Figure 38:
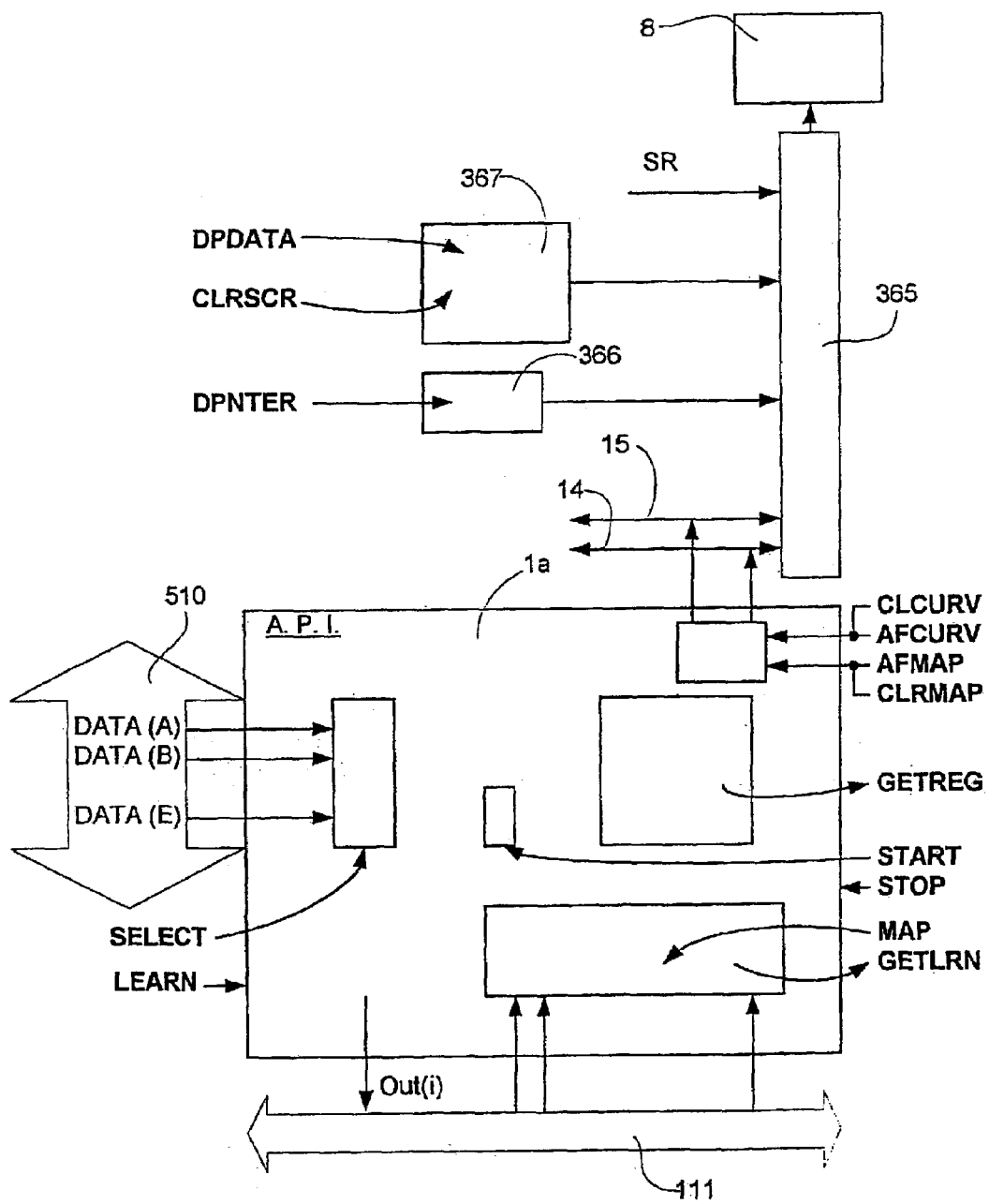
Figure 40:
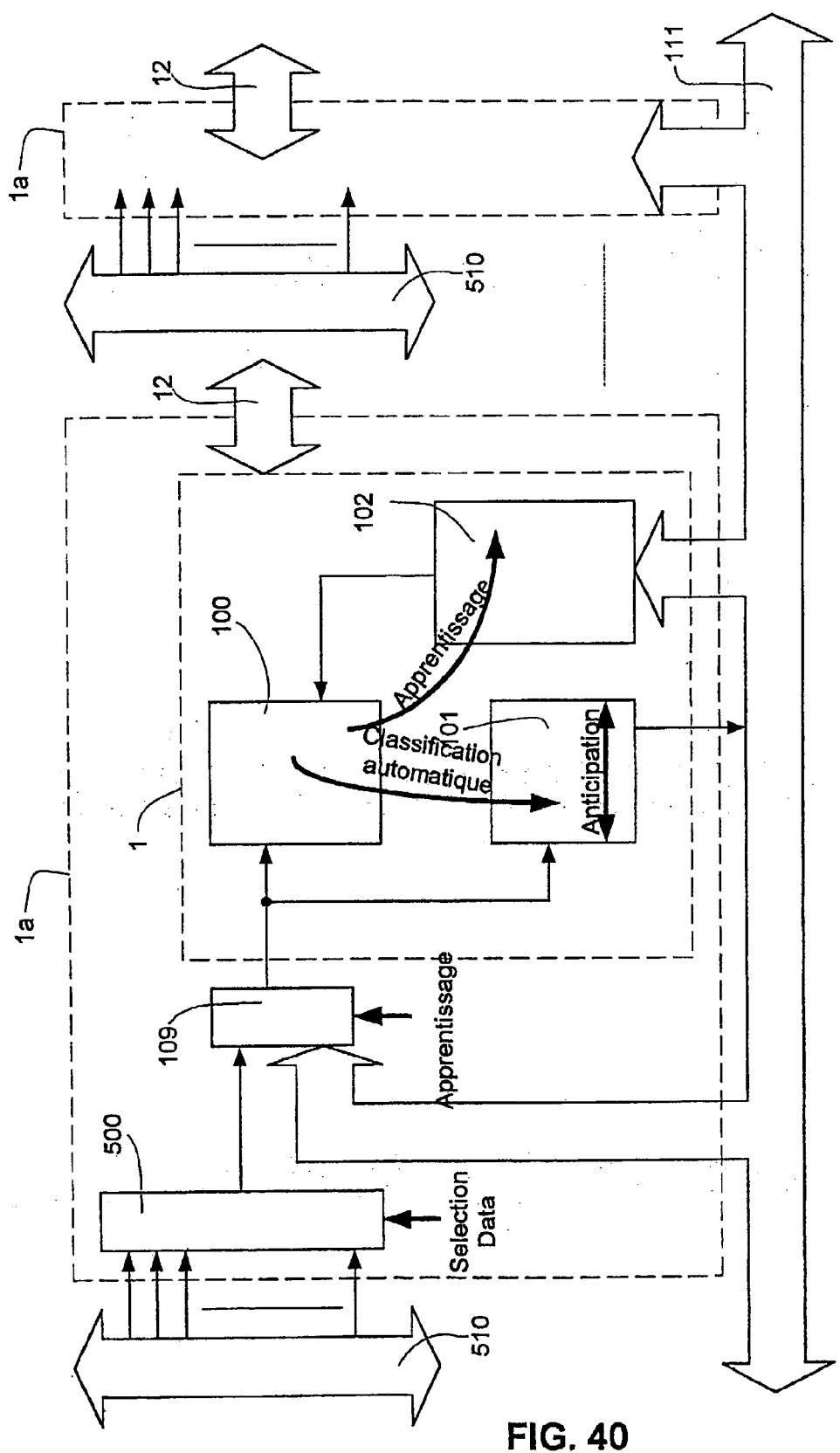

FIG. 34 corresponds to FIG. 32 in the case of a two-source acquisition;

FIG. 35 corresponds to FIG. 33 in the case of a binocular acquisition;

FIG. 36 is a schematic representation of a signal generator fitted with controlled optics;

FIG. 37 shows the case of a three-source acquisition;

FIG. 38 is a representation of the application management interface (API);

FIG. 39 illustrates a sound signal processing device according to the invention;

FIG. 40 is a simplified representation of a device according to the invention.

The invention can be subject to numerous embodiments. The information processed can be of various natures and represent multiple data or parameters. However, its first application is image processing, whereby said images make up the space considered. This space is then, obviously, two-dimensional. The following detailed description corresponds to this particular embodiment.

Figure 1:
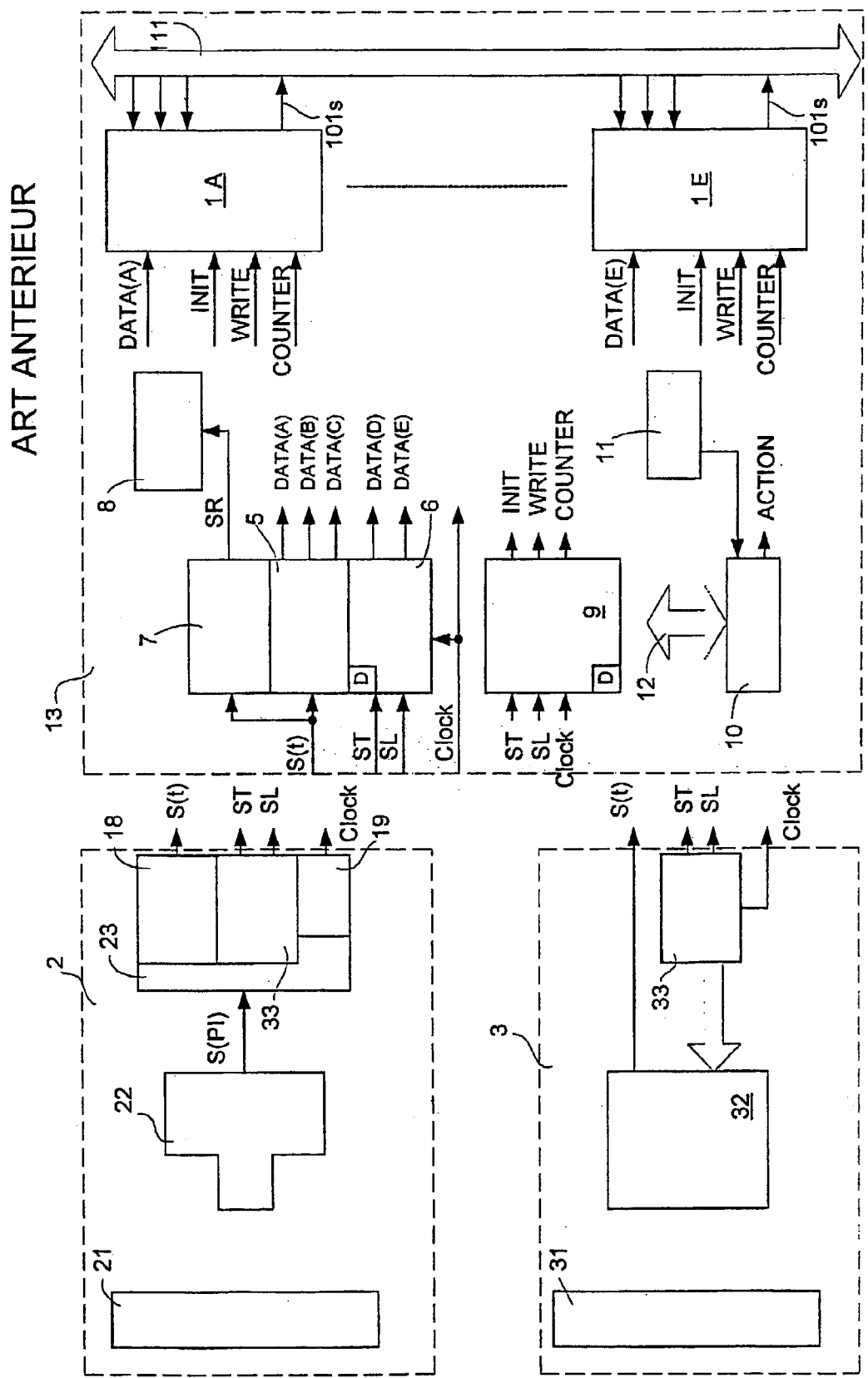
FIG. 1 is a representation of the histogram calculation unit according to the invention, in its context.
Figure 2:
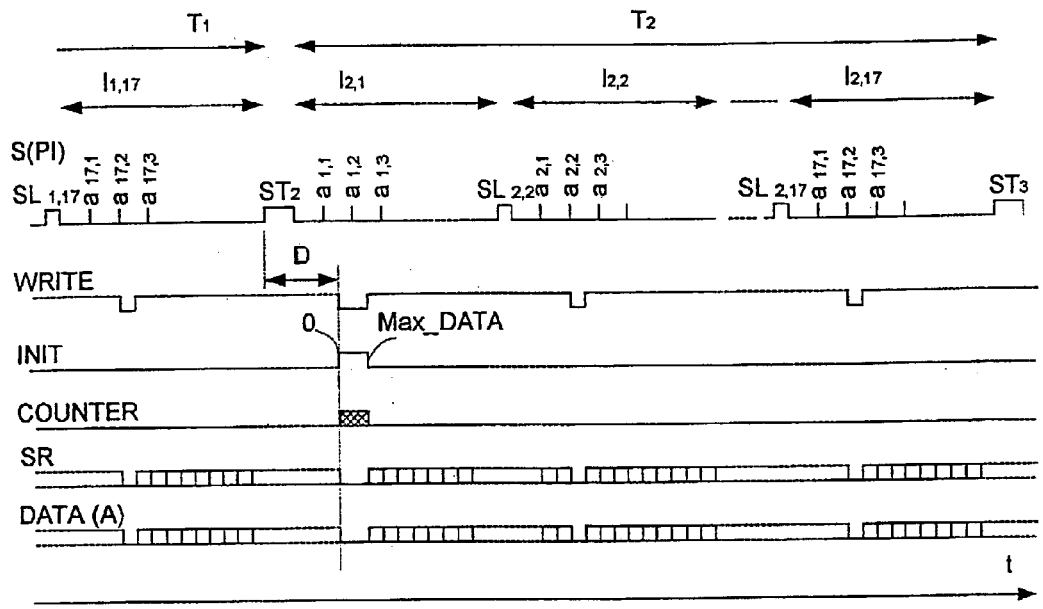
FIG. 2 is a representation of the input video signal, processed by the device and the method of the invention and of the control signals generated by a sequencer.

The histogram calculation unit 1 of the invention is represented in its context on FIGS. 1 and 2.

This histogram calculation unit 1 is part of a visual perception unit 13 which receives and processes a signal S(t) or S(PI). The histogram calculation unit processes and generates so-called time coincidences information S'(t) on a bus 111. More precisely, FIG. 1 represents several associated histogram calculation units 1A, 1B, . . . , E in the same visual perception unit.

In one embodiment, the visual perception unit 13 processes various signals relating to one or several visual scenes. In other embodiments, the perception unit 13 processes other perception parameters, for example, sounds, odours, . . . The following description relates mainly to visual perception, although it can be adapted to other parameters.

A sequencer 9 generates, based upon synchronisation signals ST, SL, CLOCK, sequence signals INIT, WRITE and COUNTER which control the histogram calculation units.

As represented on FIG. 1, the input signals of the sequencer 9 (SL, ST, CLOCK) may come from a signal generator assembly 2 comprising a camera 22 or a signal generator assembly 3 comprising a CMOS imaging device 32.

When the input signals come from an assembly 2 comprising a camera, this assembly imposes frame and line synchronisation signals so that the histogram calculation unit and its sequencer operate in a slave mode or synchronisation slave mode.

Conversely, in case when these signals come from an assembly 3 comprising a CMOS imaging device, the sequencer 9 operates in a master mode and generates itself the synchronisation signals.

More precisely, the assembly 2 enables acquisition of data from a scene 21 by a camera 22. The camera 22 produces a signal S(PI) whereof the form, of the type represented on FIG. 2, will be described in detail below.

The electronic control unit 23 of the camera 22 then provides the signals S(t) resulting from the extraction of S(PI), ST, SL synchronisation signals and the CLOCK signal originating from a phase-lock loop, which are used by the histogram calculation unit.

In the case of an assembly 3 comprising a CMOS imaging device, this imaging device 32 is used for the acquisition of data of the scene 31, it supplies S(t) and is driven by a synchronisation unit 33 which produces the frame synchronisation signals ST and the line synchronisation signals SL, as well as the CLOCK signal used by the CMOS imaging device 32 as well as by the other elements of the visual perception unit 13.

The histogram calculation units 1 are advantageously co-ordinated to a spatial 6 and temporal processing unit 5 which has been described in the patent application WO-98/05002, and to a delay line 7. The spatial and temporal processing unit 5 and 6 corresponds to the device referred to as 11 in the patent application mentioned. It receives the signal S(PI) and generates parameters V (speed), DI (direction), each corresponding to one of the inputs identified as DATA(A) . . . DATA(E) in this application.

These parameters may also include the spatial resolution, the image structure (multiscale contrast change in polar coordinates, etc. . . . ), as they result from a wavelet analysis by Gabor and described in Daugman's article (1988) "Complete Discrete 2D Gabor Transform . . . , IEEE Trans. Acoust. Speech Signal Process 36:1169–1179.

This assembly, composed of a histogram calculation unit 1, the spatial and temporal processing unit 5, 6 and the delay line 7, supplies either so-called 'time coincidences' information, generally in digital form, that can be processed by a downstream device, or a signal enabling visualisation of information on a screen 8 via the bus 111.

Figure 3:
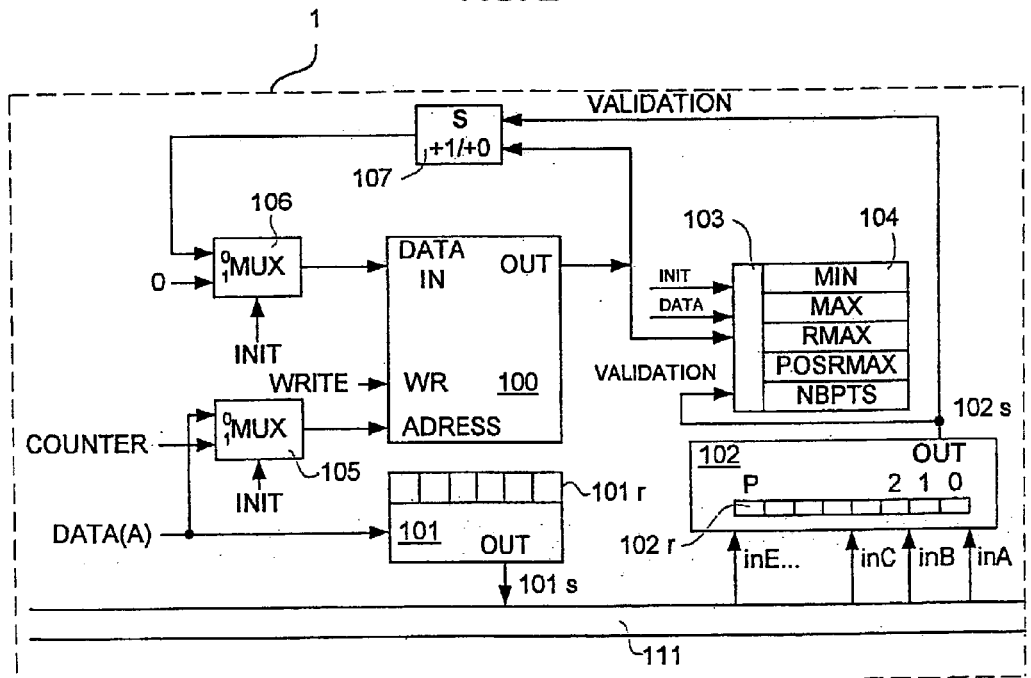
FIG. 3 is a diagram representing a passive histogram calculation unit.

A passive (non self-adapting) histogram calculation unit and without anticipation is represented on FIG. 3.

This histogram calculation unit is intended for processing the values of a parameter A that are affected at each pixel in a signal $S(t) = \{a_{ijT}\}$ of the video type.

More precisely, a video type S signal means a signal which is composed of a succession of frames, wherein each frame includes a succession of pixels whereof the assembly forms a space, for example an image for a two-dimensional space. In such a case, the frames are themselves broken down into lines and columns. This signal S(t) carries a value $a_{ij}$ of the parameter A for each pixel (i,j) expressed on n bits (n=8 being currently employed most often). The succession of the frames represents therefore the temporal succession of images. In the notation $\{a_{ijT}\}$, T represents the frame, i is the number of a line in the frame T, j is the number of the column of the pixel in this line, a is the value of the parameter A associated with the pixel ijT.

The signal S can be an analogue signal. However, it is preferably digital and composed, as represented on FIG. 2, of a succession of frames $T_1$ and $T_2$, each being formed of a succession of horizontal scanned lines such as $I_{1.1}$, $I_{1.2}$, ..., $I_{1.17}$ for $T_1$ and $I_{2.1}$ ... for $T_2$. Each line includes a succession of pixels or image points PI.

S(PI) comprises a frame synchronisation signal (ST) at the beginning of each frame, a line synchronisation signal (SL) at the beginning of each line that is not a beginning of frame as well. Thus, S(PI) comprises a succession of frames which represents the temporal array and, within each frame, a series of lines and of pixels arranged in columns which are significant of the spatial array.

In the temporal array, <<successive frames>> designate chronologically successive frames and <<successive pixels at the same position>> designate the successive values $a_{ij}$ associated respectively to the pixels (ij) placed at the same location in the successive frames, i.e. for instance (1, 1) of $I_{1.1}$ in the frame $T_1$ and (1,1) of $I_{2.1}$ in the corresponding following frame $T_2$ ...

On the basis of the S(PI), as indicated above with reference to the application PCT/FR-97/01354, the spatial 6 and temporal 5 processing unit generates one or several signals DATA(A) ... DATA(E).

The passive histogram calculation unit without anticipation, as represented in FIG. 3, processes a signal DATA(A) whereof the structure is represented in FIG. 2. This signal may be received directly from either a camera or any other image acquisition system, or may have been subjected previously to a first process, for example spatial and/or temporal processing.

It generates a signal 101s of similar structure which carries for each pixel a piece of information significant of the result obtained when applying recognition or selection criteria.

As shown in FIG. 3, the histogram calculation unit 1 includes an analysis memory 100, an address multiplexer 105, a data input multiplexer 106, an incrementation unit 107, a classifier 101, a time coincidences unit 102 and a test unit 103, whereof the operations will be described below.

All elements of the histogram calculation unit are controlled and synchronised by a clock signal (clock).

I. The Analysis Memory

This histogram calculation unit 1 comprises an analysis memory 100.

This analysis memory 100 is preferably a conventional synchronous or asynchronous digital memory, such as a DRAM, SDRAM or the like. This memory includes a number, n, of addresses, d, equal to the number of possible levels for the values of the parameter A that must be discriminated.

Each of these addresses can store at least the number of pixels contained in a frame (i.e., in an image).

For each frame, after quick resetting by the command signal INIT, a signal WRITE enables, throughout the frame, the processing of the data DATA(A). Thus, the analysis memory 100 is capable of receiving the signal DATA(A). For each frame received, the pixels for which the value of the parameter A has a value $a_{ij}$=d (if they are enabled by an enabling signal 102s as will be described below), will increment the content of the address of row d of the memory 100 by a value 1. Thus, after having received a complete frame, the memory 100 comprises, at each of its addresses d, the number of pixels that are enabled and for which the parameter A had a value d.

II. The Address and Data Input Multiplexers

The histogram calculation unit 1 also comprises an address multiplexer 105 and a data input multiplexer 106.

Each multiplexer contains a binary selection control signal, two inputs and one output.

The value of the output of each multiplexer corresponds to one of the inputs when the selection control signal is equal to 1, and the other input when the control signal is equal to zero.

As shown, when the control signal INIT is equal to zero, the address multiplexer 105 selects an address in the analysis memory 100 in relation to the level d of the signal received ($a_{ijT}$), and the data input multiplexer 106 transfers the incrementation of the value contained in this memory in relation to the status of the selection control.

When the control signal INIT is equal to 1, the address multiplexer 105 transfers the signal of the counter that increments the address from zero to the maximum value of DATA(A). The data input multiplexer 106 forces zero on the input of the memory 100.

III. The Incrementation Unit

The histogram calculation unit also comprises an incrementation unit 107.

It is a controlled adder comprising one input, one command and one output.

The output of the incrementation unit is equal to the output of the analysis memory 100 if the enabling signal 102s is equal to zero; it is equal to this same value increased by 1 in the reverse case.

IV. The Classifier

The passive histogram calculation unit also comprises a classifier unit 101 which includes a register 101r capable of storing certain possible level values ($d_1$, $d_2$, ... ) for the levels of the parameter A.

The classifier 101 receives the signal DATA(A), sorts the pixels, provides, on its output 101s, a value 1 when the parameter A associated with said pixel has a level corresponding to that contained in the register 101r ($d_1$, $d_2$, ... ) and the zero value conversely.

The output of the classifier 101 is connected to a bus 111.

V. The Time Coincidences Unit

The histogram calculation unit also comprises a time coincidences unit 102.

This time coincidences unit 102 is connected to the bus 111. It includes at least one register 102r and receives for each pixel of DATA(A) signals, the output values ($in_E$, ..., $in_B$, $in_A$) of the classifiers 101 of the various histogram calculation units 1 connected to the bus 111.

This time coincidences unit 102 compares the values thus received to those contained in its register 102r and transmits, on its output 102s, for each pixel, an enabling signal equal to 1 when there is a coincidence between the register values equal to 1 and the corresponding data received from the bus 111, and a zero value in the reverse case, which corresponds to the following Boolean function:

$$out = (\overline{in_o} + Reg_o).(\overline{in_1} + Reg_1) \ldots (\overline{in_n} + Reg_n)(in_o + in + \ldots in_n)$$

VI. The Test Unit and the Analysis Output Register

The histogram calculation unit also comprises a test unit 103 receiving the information coming from the analysis memory 100 and connected to analysis output registers 104.

The analysis output registers 104 are intended for receiving statistical information prepared on the basis of the values of the parameter A of the signal DATA(A) for each frame.

This information may be, for example, minimum values (MIN) and maximum values (MAX) of the parameter A, of the number of occurrences (RMAX) of the most represented value and of the position (POSRMAX) of this value, as well as of the number (NBPTS) of points for which information has already been received.

The test unit 103 updates the analysis output registers 104 in relation to the information that it receives.

The incrementation enabling unit 107 also outputs a signal addressed to the test unit 103 that enables the test unit 103 to increment the analysis output register 104 in a favourable hypothesis.

It can be understood that, after processing a complete frame, the histogram calculation unit 1 has produced statistical information representative of this frame, available in the analysis output register 104 and processable for all intended purposes, either for operator-accessible visualisation or for processing by any other programme or automaton.

The analysis output registers 104 comprise memories for each key-feature such as the minimum (MIN) of the histogram, the maximum (MAX) of the histogram, the number of points (NBPTS) of the histogram, the position (POSRMAX) of the maximum of the histogram and the number of points (RMAX) at the maximum of the histogram. These features are determined in parallel with the formation of the histogram by the test unit 103, as follows:

For each pixel that is validated:

(a) if the value of the parameter DATA(A) of the pixel<MIN (which is initially set to the maximum possible value of DATA(A) of the histogram), then the value of the parameter is inscribed in MIN;

(b) if the value of the parameter DATA(A) of the pixel>MAX (which is initially set to the minimum possible value of DATA(A) of the histogram), then the value of the parameter is inscribed in MAX;

(c) if the content of the memory 100 at the address of the value of the parameter of the pixel>RMAX (which is initially set to the minimum possible value DATA(A) of the histogram), then i) the value of the parameter should be written into POSRMAX and ii) the output of the memory should be written into RMAX;

(d) NBPTS (which is initially set to the value zero) should be increased by one unit.

VII. Global Operation of the Passive Histogram Calculation Unit

Several histogram calculation units, 1A, 1B, . . . , 1E, are connected to the same time coincidences bus 111. This description refers to five histogram calculation units A to E. Extrapolation to any number of units is evident.

A. Signal WRITE

For each signal WRITE, each histogram processing unit supplies to the bus, for each pixel, the output signal 101s of its classifier 101 and each they each receives all these signals on the input $in_A, \ldots, in_E$ of its time coincidences unit 102.

The parameter, for example DATA(A) for the unit 1A, is compared to the content of the register 101r of the classifier 101 The result, inA=101s, of this comparison is a binary signal 101s that is addressed at the same time as its counterparts inB . . . inE, from the other units, 1B . . . 1E.

The time coincidences unit 102 compares these values taken together to the content of its register 102r constituting a time coincidences criterion, R, and generates, on its output 102s, a binary signal whereof the value depends on the result of the comparison.

This signal 102s controls the adder 107, when it is equal to 1, it produces, via the data multiplexer 106, the incrementation by one unit of the content of the register of the memory 100 corresponding to the value of the parameter DATA(A), simultaneously the test unit 103 ensures statistical processing of the content of the memory 100 and transfers the content thereof into the analysis output register 104.

At the end of the signal WRITE, each of the registers of the memory 100 contains as a value d, the number of pixels for which the signal DATA(A) showed the corresponding value d and that the time coincidences unit 102 has enabled.

B. Signal INIT

During the signal INIT, the signal COUNTER that scans the values from 0 to n, resets the registers of the memory 100.

VIII. Self-Adaptation

In the description made until now, the memory of the classifier 101 includes a register 101r whose content determined outside the system is fixed. Such a classifier is said to be passive.

Self-adapting consist in automatic updating, by the system itself, of the content of the memory of the classifier, whereas this content is then a look up table (LUT). This enables thus to obtain a self-adapting histogram calculation unit 1.

Figure 4:
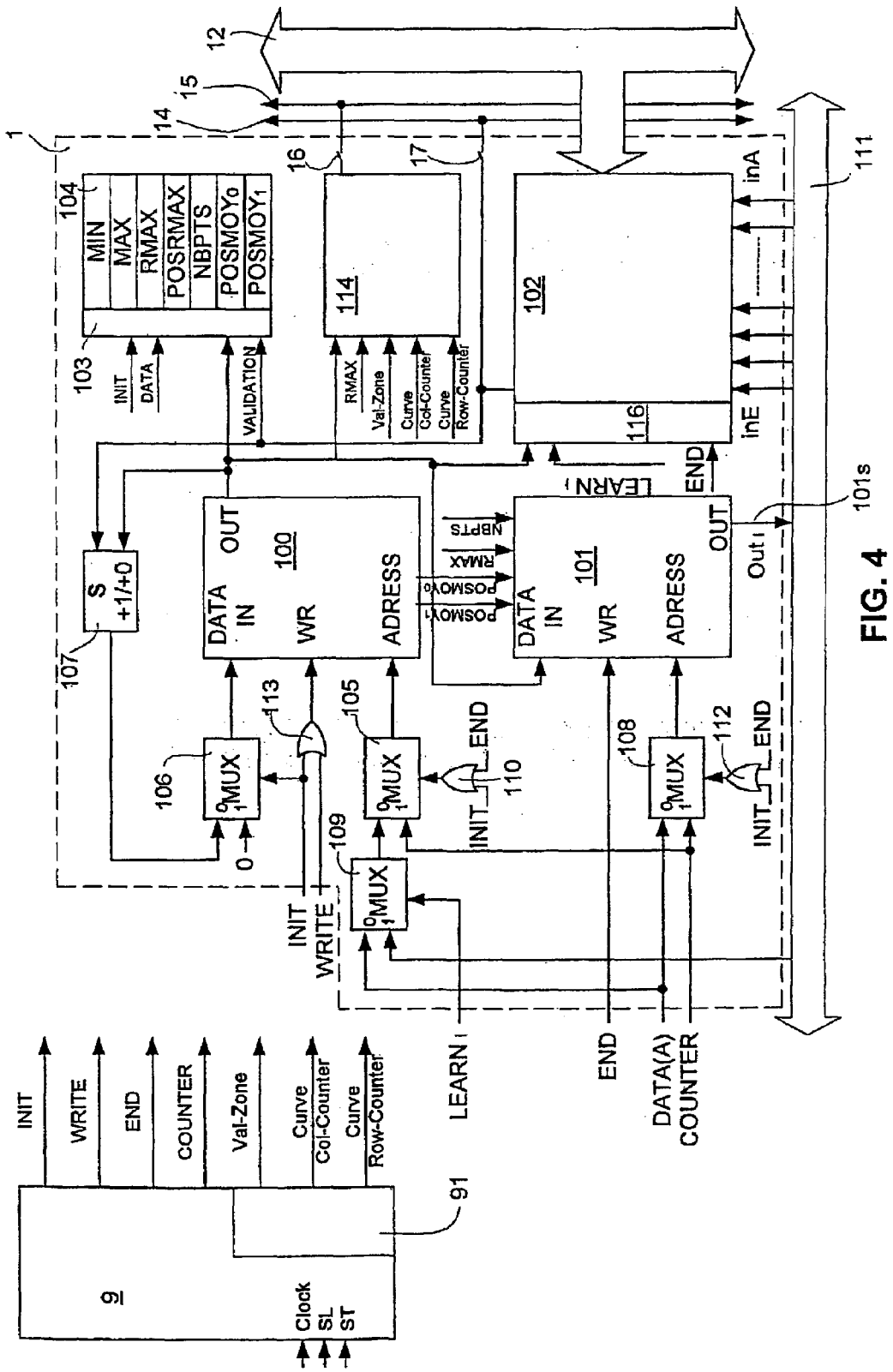
FIG. 4 is a diagram representing a self-adapting histogram calculation unit according to the invention with the anticipation and learning functionalities.

To fulfil the self-adapting function, i.e. real-time updating of the classifier, the histogram calculation unit of FIG. 3 is perfected according to FIG. 4.

Instead of having a simple register 101r written outside the system, the classifier 101 has an addressable memory whose writing is controlled by a signal END.

Figure 5:
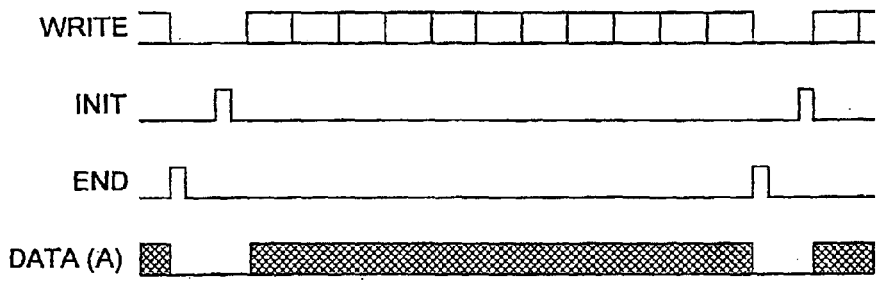
FIG. 5 is a diagram representing signals processed by the calculation unit of FIG. 4.

The sequencer 9 generates this signal END represented in FIG. 5. The histogram calculation unit 1 comprises a selection operator OR 110, receiving at its input the signals INIT and END and whose output is connected to the control of the address multiplexer 105.

The memory of the classifier is controlled by the system properly speaking. Its content is modifiable, it comprises a data input DATA IN, a write command WR and an address input ADDRESS.

This address input is connected to the output of an anticipation multiplexer 108. This 'two to one'-type multiplexer 108 comprises an anticipation command connected to the output of an operator OR 112 receiving as its input the signals INIT and END.

The inputs of the anticipation multiplexer receive the same signals as the inputs of the address multiplexer 105 (e.g., DATA(A) and COUNTER).

When the signal END is equal to 1, the memory of the classifier is written by a signal resulting from the comparison between the value of the histogram memory 100 and a value derived from the analysis output register 104 (RMAX/2) for all the possible values of DATA(A).

Hence the classifier acts as a classification function $f_A$ which is the relationship that it establishes between the data DATA(A) that it receives and the output binary value $(101s)_A$ that it produces, via the memory of the classifier 118. This enables to reduce the representation of the information which takes up a single bit.

A. First Embodiment of Classifier

Figure 12:
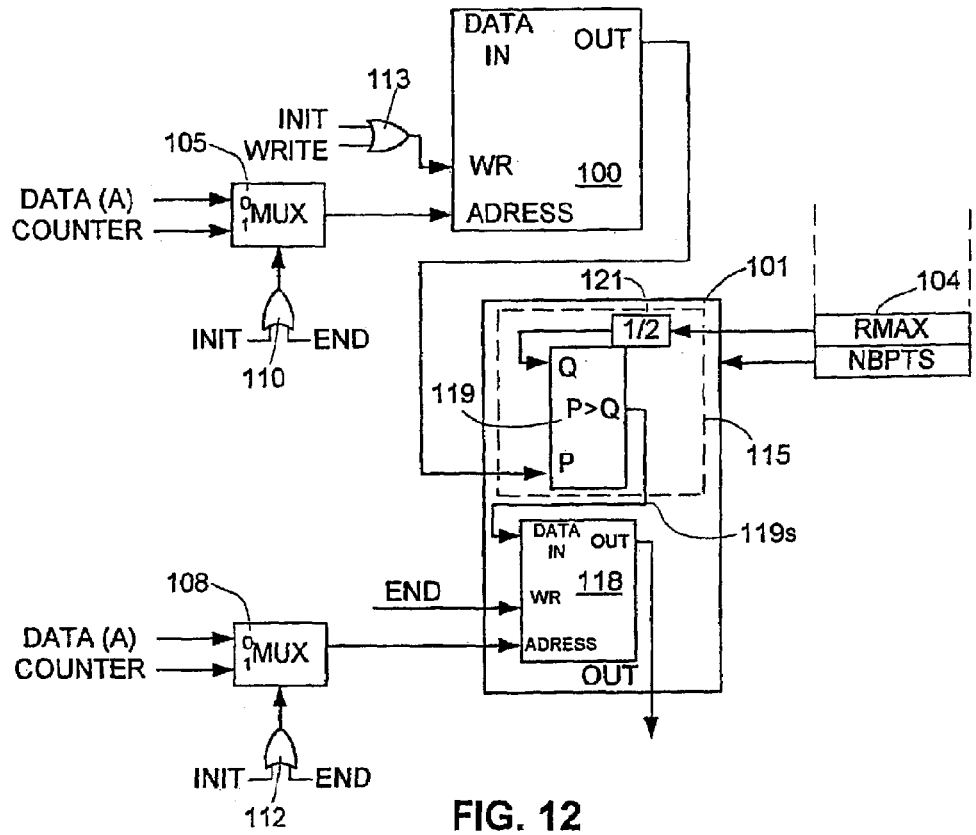
FIG. 12 is a representation of the essential elements of the histogram calculation unit with a self-adapting functionality.

With reference to FIG. 12, the classifier fulfilling the self-adapting function comprises a memory 118 whereof the writing input WR receives the signal END and the address input ADDRESS receives the output signal of the address multiplexer 108. It also includes a comparator 119 comprising two inputs and one output that is connected to the data input DATA IN of the memory 118.

The first input of the comparator 119 receives the value RMAX/2 derived from an analysis output register 104 and its second input receives the output of the memory 100.

The operation of the memory 118 of the classifier is then as follows.

It comprises the same number of words as the analysis memory 100, but in the memory 118, each word comprises one bit only.

At the end (signal END=1) of the reception of a new data flux DATA(A) of a given frame, a writing sequence starts.

If for a given memory address d of the analysis memory 100, the value read is greater than RMAX/2, a value 1 is inscribed into the memory 118 at the corresponding position. Conversely, the value 0 is inscribed in this position. All the memory addresses d are scanned from 0 to n. The memory 118 of the classifier is thus updated.

B. Second Embodiment of Classifier

Figure 13:
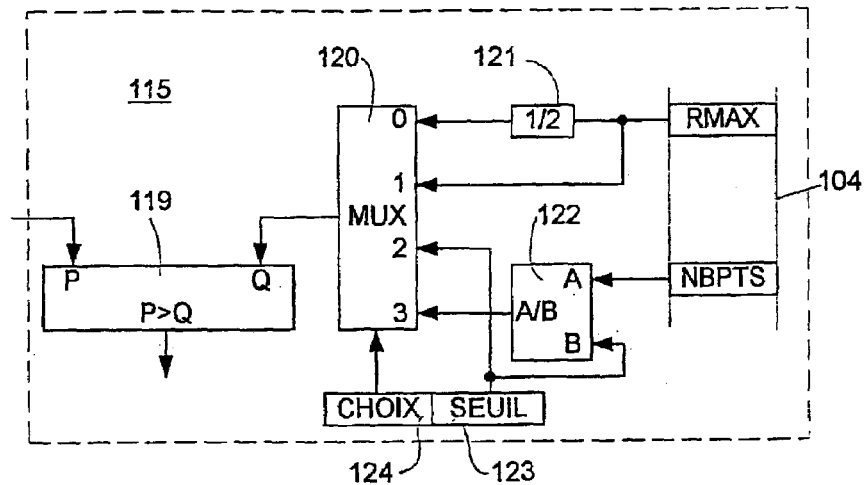
FIGS. 13 and 13c are representations of an enabling counter fitted with several self-adapting functionalities.

FIG. 13 represents an alternative embodiment of the classifier wherein a multiplexer 120 is controlled by a selection command 124 and enables comparison of the parameter P to a statistical value Q, which can be prepared in various ways in relation to the statistical parameters received on the different inputs 0, 1, 2, 3 which are selected by the selection command 124. The selection command depends on the content of the register 'SELECTION'. The input 0 of the multiplexer 120 receives the value RMAX/2 produced on the basis of the data in the analysis output register 104 by the two divider 121, the input 1 of the multiplexer 120 receives directly the value RMAX, the input 2 of the multiplexer 120 receives a threshold value contained in a register 'THRESHOLD' 123 whereof the content is programmed outside the system, and the input 4 of this multiplexer receives the quotient of the number of points NBPTS by the THRESHOLD 123 produced by the divider 122.

Therefore, as represented on FIG. 13, the parameter P can be compared to the respective values RMAX/2, RMAX, at a threshold B input from the outside and in proportion to the number of points NBPTS attached to this threshold by the divider 122.

The content of the memory 118 is updated, in relation to the signals supplied by the comparator 119 similarly to the update described in the first embodiment.

C. Third Embodiment of Classifier

Figure 13A:
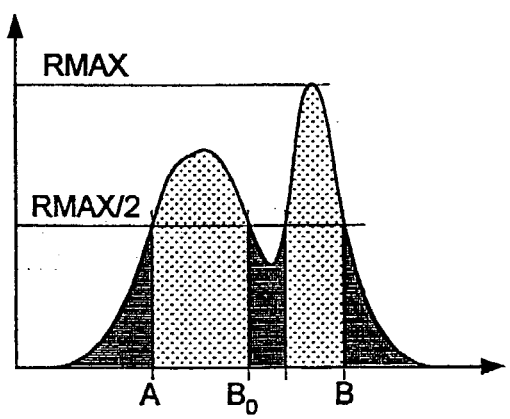
FIGS. 13a and 13b are representations of statistical distributions of a parameter and classification criteria.
Figure 13B:
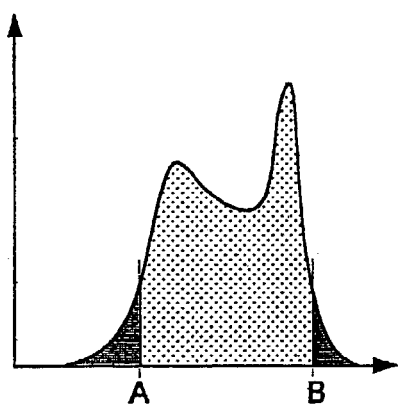
Figure 13C:
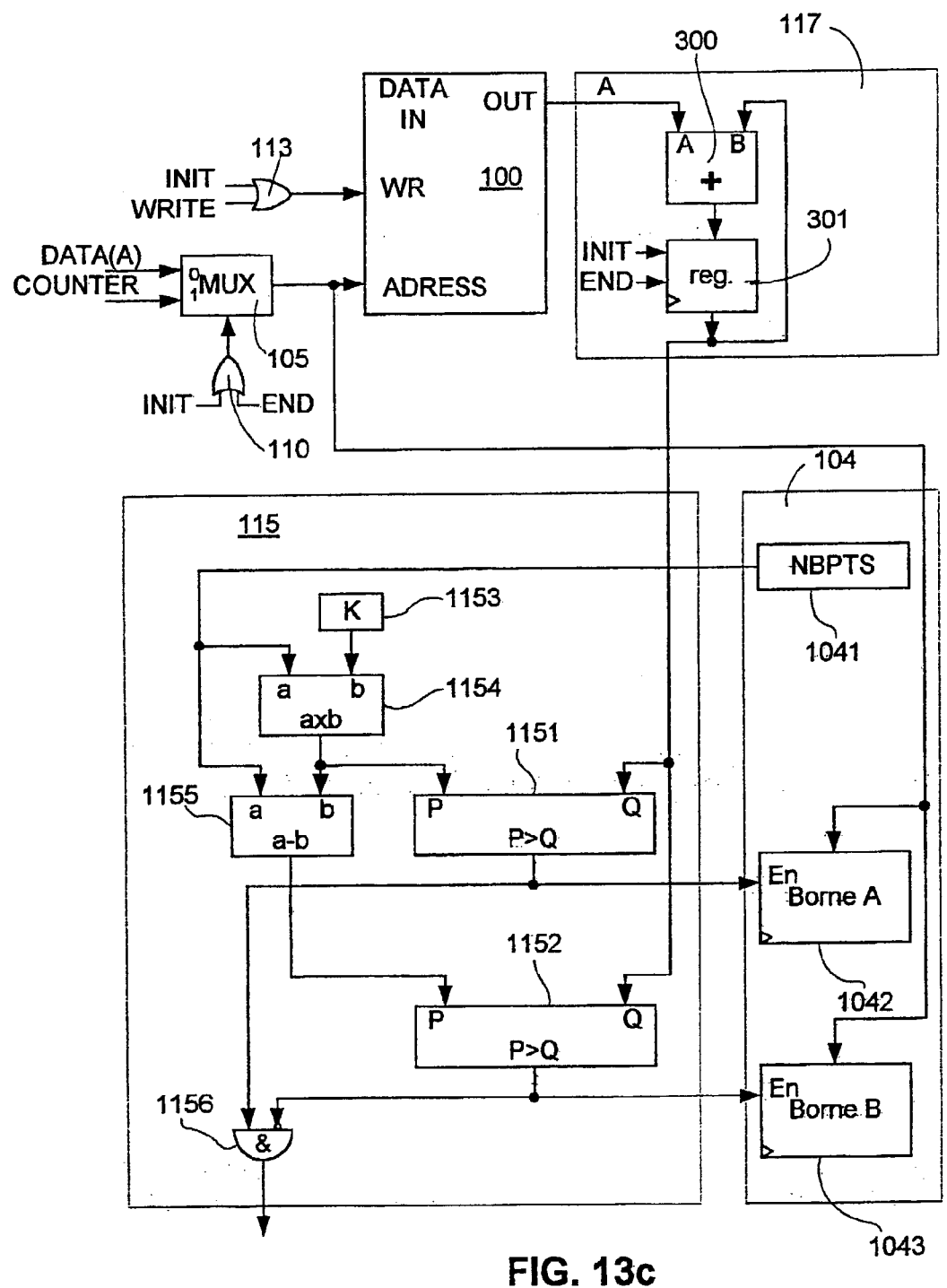

FIGS. 13a, 13b, 13c represents a third embodiment of a classifier wherein the cumulative total of occurrences in a histogram is used instead of the levels of said occurrences. The classification boundaries are defined, for example, by the use of a register RMAX, corresponding to a maximum of occurrences of the analyzed parameter, and in searching for the parameter values for RMAX/2. On both sides of the RMAX position, these values correspond to limit A and limit B of the classifier.

Hence, the RMAX register such as it is operated in the second embodiment of the classifier, is replaced here with the register NBPTS, corresponding to the total cumulative result of occurrences (FIG. 13a). By removing a percentage k of NBPTS on both sides of the histogram. The limits A and B become more stable (FIG. 13b).

The device represented in FIG. 13c carries out this function.

FIG. 13c shows the analysis memory 100 and the means for entering data via the multiplexer 105. The analysis output register 104 operates as described above using the number of points NBPTS 1041 and, in general, the limit A 1042 and the limit B 1043 as well.

The learning register 117 receives the output data of the analysis memory 100 and supplies, via the register 301 fed by the adder 300, the inputs of two comparators 1151 and 1152, respectively, of the enabling calculator 115. This enabling calculator includes a memory 1153 storing the value k, percentage of the number of points to take into consideration. A multiplier 1154 receiving the number of points NBPTS on one of its inputs and the value k on the other, feeds, on the one hand, the second input of the comparator 1151 and, on the other hand, one of the inputs of a subtracter 1155, which receives on its other input the number of points. The output of this subtracter 1155 feeds the second input of the comparator 1152.

The subtracter output 1155 supplies the limit A, the comparator output 1152 supplies the limit B and an operator "NON-AND" 1156 receiving on each of its inputs, respectively the value of the limit A and on the inverted input, the value of the limit B, supplies the output signal of the enabling calculator 115.

At the end of the histogram calculation, the register NBPTS is known and a signal Frame-End allows to know the value $\alpha$=k.NBPTS and a value $\beta p$=NBPTS−$\alpha$.

While resetting to zero a cumulative function S, that is to say $S_o$=zero, the increment i of a counter connected to the address of the previously determined histogram memory allows to read the contents of this memory and to supply the cumulative register $S_i$.

A first test consists in assigning to limit A, the increment value i as long as $S_i$ is smaller than the previously defined $\alpha$ value.

A second test consists in assigning to limit B, the increment value i as long as $S_i$ is smaller than the previously defined $\beta$ value.

Generally, the classifier may be produced according to numerous embodiments, providing that it allows to place the parameter DATA(A) with respect to values or limits statistically determined over a set of previous data DATA(A).

IX. The Memory 118 of the Classifier 101

Figure 16:
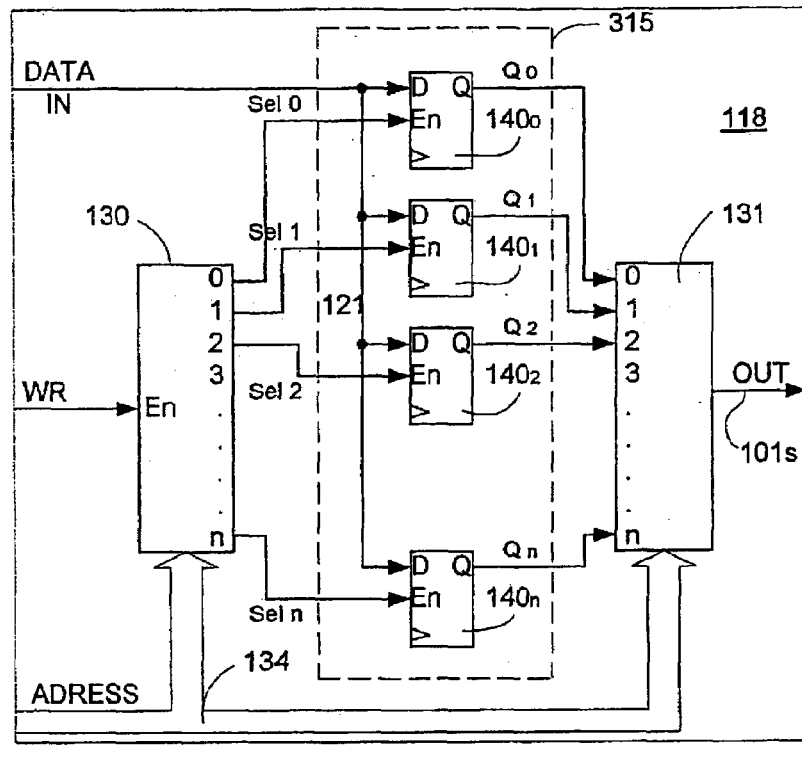
FIG. 16 is a diagram of the classifier memory.

FIG. 16 is a detailed representation of the memory 118 showing an input demultiplexer with input enabling function 130 and an output multiplexer 131. The input demultiplexer 130 receiving the writing signal WR is then capable of enabling the choice of the register of the memory 118, selected by the address command ADDRESS, for writing the binary value of the comparison DATA IN. The output multiplexer 131 sends the value of a particular register, selected by the address command ADDRESS, on the output 101s of the memory 118 of the classifier.

The input demultiplexer 130 and the output multiplexer 131 are controlled via bus 134 originated from the anticipation multiplexer 108.

More precisely, the 1/n input demultiplexer 130, controlled by the address transmitted by the bus 134, sends the signal WR (WRITE), respectively in the form of the signals $Sel_0$, $Sel_1$, $Sel_2$, . . . , $Sel_n$ on the registers $140_0$, $140_1$, $140_2$, . . . , $140_n$ of order 0, 1, . . . , n and determines which of its registers as addressee of the content of the information transmitted by the signal DATA IN. At output, the information originating from these registers $140_0$, $140_1$, $140_2$, . . . , $140_n$ is sent to the multiplexer 131, which determines the output, OUT.

X. Anticipation

In a preferred embodiment, in addition to real time updating, the histogram processing unit 1 performs an anticipation function.

Such anticipation of the self-adapting function of the classifier improves the operation of this looped system and assimilates it to the operation of a physiological system.

The purpose of the anticipation is, as the name implies, to anticipate the value contained in the memory 118 of the classifier in order to speed up the processing and thereby to facilitate the tracing of an object or its evolution.

To this end, the global variation of the histogram is calculated and the result is then used to apply the anticipation according to one of the following methods. In either case, the anticipation defines an anticipation function $g_A$ which, combined to the classification function $f_A$, produces a function ($f_A o g_A$), linking the data DATA(A) and the output value $(101s)_A$, characterizing the histogram calculation unit processing the parameter A.

A. Calculation of the Global Variation of the Histogram

The test unit 103 and the analysis output registers 104 generate a statistical value POSMOY whereof the values $POSMOY_0$ and $POSMOY_1$ for two successive frames are memorised. POSMOY is the value of the parameter DATA (A), in relation to which, in a given frame, said parameter has a value greater than or equal to half the enabled points in the frame and a smaller value for the other half.

Preparation

When the signal END is equal to 1, the new value $POSMOY_0$ is calculated and the previous value of $POSMOY_0$ is saved in $POSMOY_1$.

POSMOY

Figure 14:
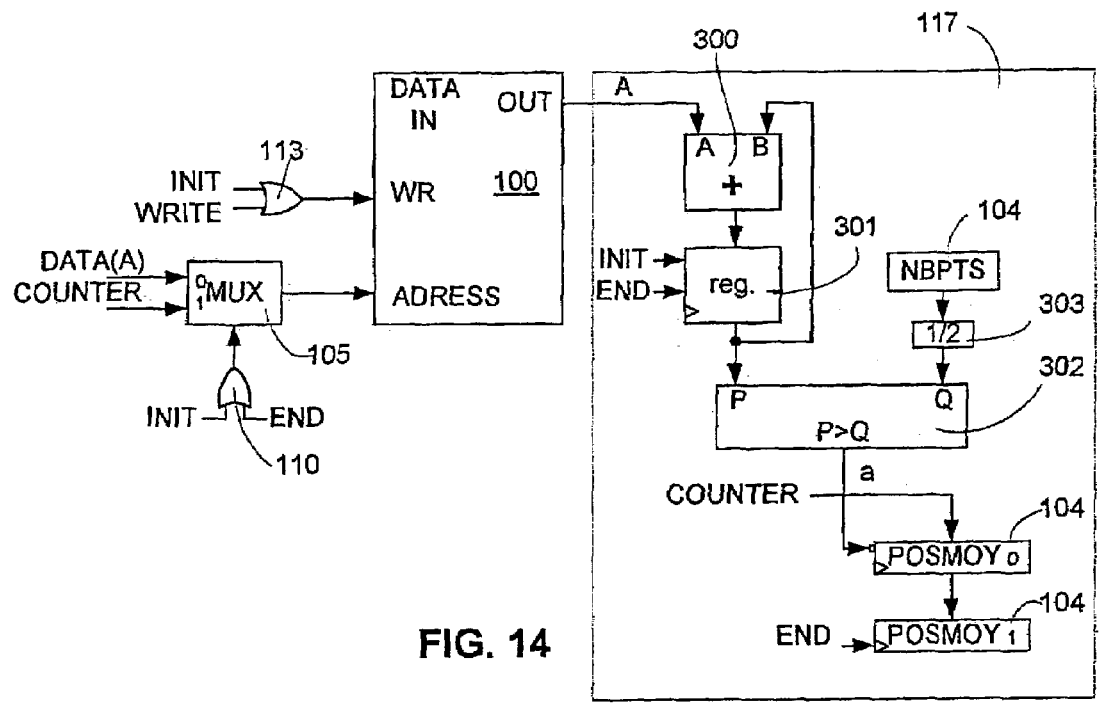
FIG. 14 is a representation of the elements of a histogram calculation unit producing values POSMOY.

With reference to FIG. 14, the elaboration of the variable $POSMOY_0$ will now be described.

This variable $POSMOY_0$ is produced by a comparator 302.

This comparator 302 receives, which on one of its inputs Q, the parameter NBPTS that is divided by two by the divider 303.

Its second input P is fed by the output of a register 301 that is controlled by the initialisation INIT and the end END signals, and receives at input, the output of an adder 300, which itself receives at input, the output value of the register 301 and on its second input, the output value of the memory 100 that has been described previously.

Thus, the register 301, reset initially, stores the cumulated content of the registers of the memory that are scanned by the signal COUNTER from zero to n.

As long as this cumulated value is smaller than NBPTS/2, the value of the COUNTER is stored in $POSMOY_0$. At the end of the cycle END, $POSMOY_0$ therefore contains the last value COUNTER for which the cumulated value is smaller than NBPTS/2.

B. Application of the Histogram Variation to the Anticipation (First Method)

Figure 15:
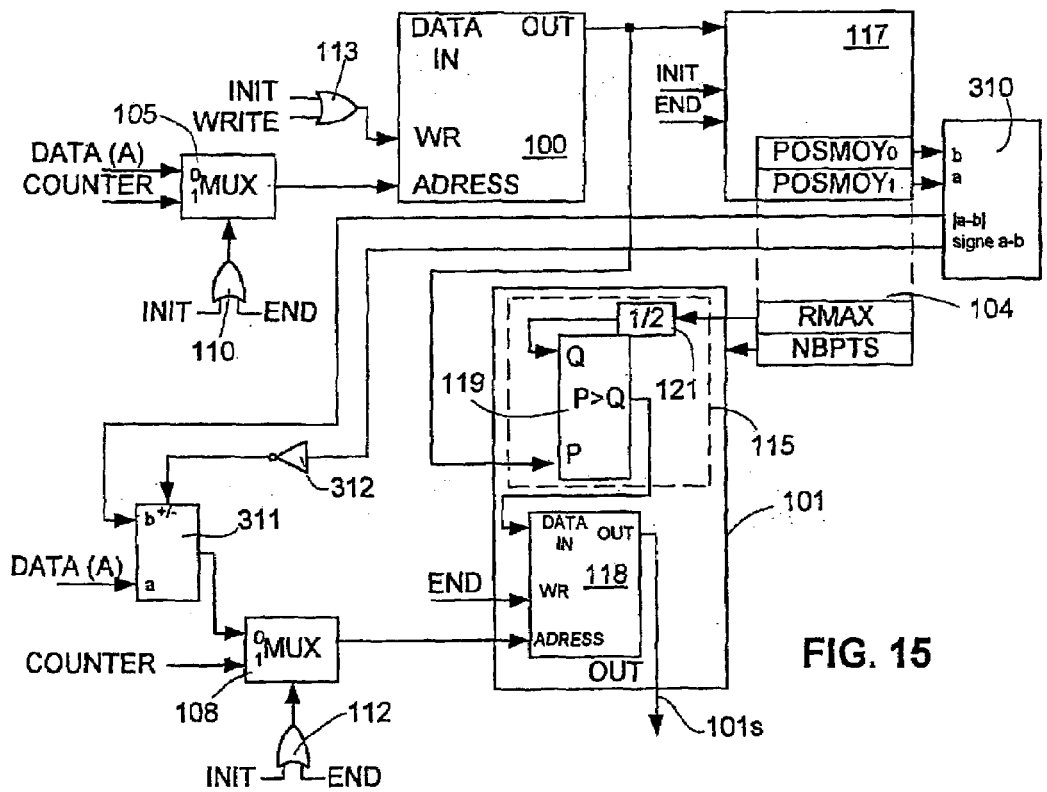
FIG. 15 is a diagram representing the essential elements of the self-adapting histogram calculation unit with anticipation according to a first method.

FIG. 15 illustrates this first method. The memory 118 is that described previously with reference to FIG. 16.

An automaton 310, so-called calculation with sign extraction capability, supplies the values |$POSMOY_0$ minus $POSMOY_1$| and the sign of this difference.

These parameters control a translator 311 after reversal of the sign by the inverter 312.

The value of the parameter supplying the memory 118 is thus offset by the value |$POSMOY_0$ minus $POSMOY_1$| with respect to the passive operation, in the direction opposite the POSMOY variation calculated in the unit 310.

Figure 15A:
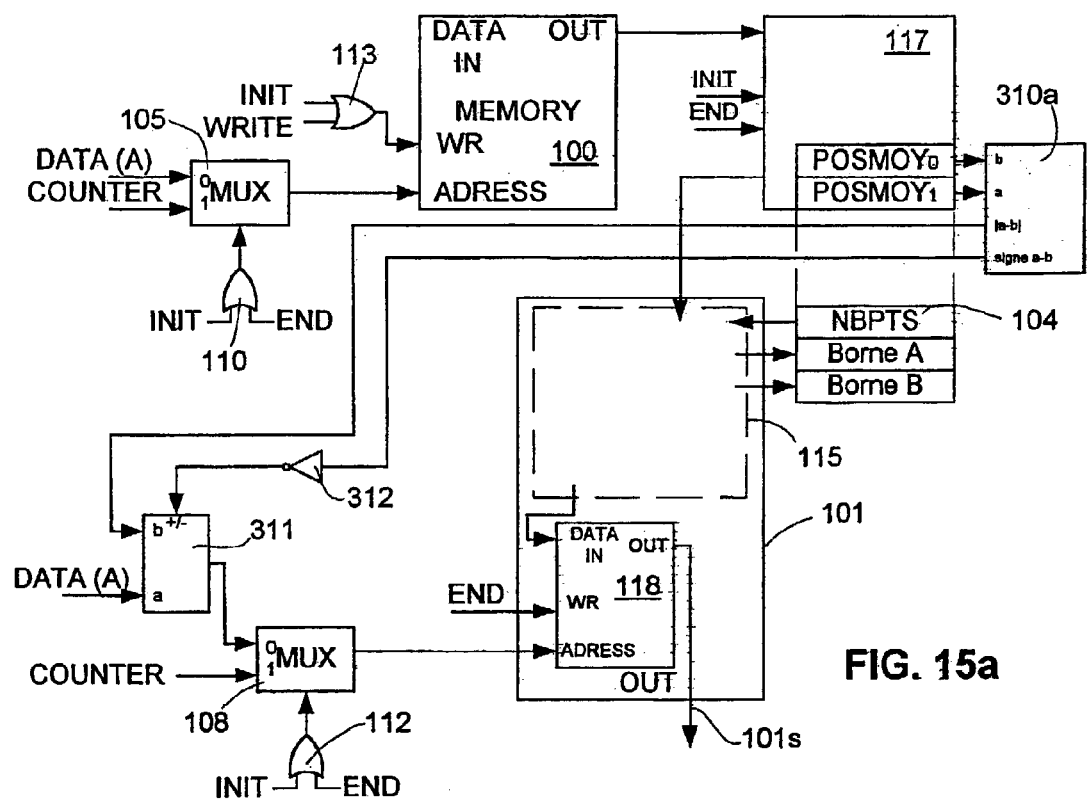
FIG. 15a is a diagram similar to FIG. 15 implementing a first generalised anticipation method.

FIG. 15a illustrates a circuit according to an alternate embodiment that is configured to implement the first method for applying the histogram variation to anticipation. In this embodiment, the calculation unit 310a is similar to the calculation unit 310, but it offers more flexible possibilities with respect to the offset of the value of the parameter supplied to the memory 118. Wherein the calculation unit 310 of FIG. 15 provides an offset determined by a function of the form y=x, where x is ($POSMOY_0$ minus $POSMOY_1$), the calculation unit 310a provides for an offset determined by functions of the form y=ax+b, where a (e.g., k1 and k2) and b (e.g., c1 and c2) are adjustable constants which can be provided by a processor It will, of course, be apparent that any other function of the POSMOY values can be used as desired, such as $y=ax^2$. In FIG. 15a, the multiplexer 127 receives at input the two functions of POSMOY, namely $k1 \times (P_0-P_1)+c1$ and $k2 \times (P_0-P_1)+c2$, and provides one output based on the value of the control signal "Clock".

To further increase the range of classification, the circuit OR 125 and the delay circuit 126 can also be used. The delay circuit is controlled by the same clock signal which controls the multiplexer 127. The output values of the memory 118 related to both different offset functions are then provided to the gate OR 125, whereof the output is the signal $102s$ with an improved classification range, and therefore improved anticipation characteristics.

C. Application of the Histogram Variation to the Anticipation (Second Method)

Figure 17:
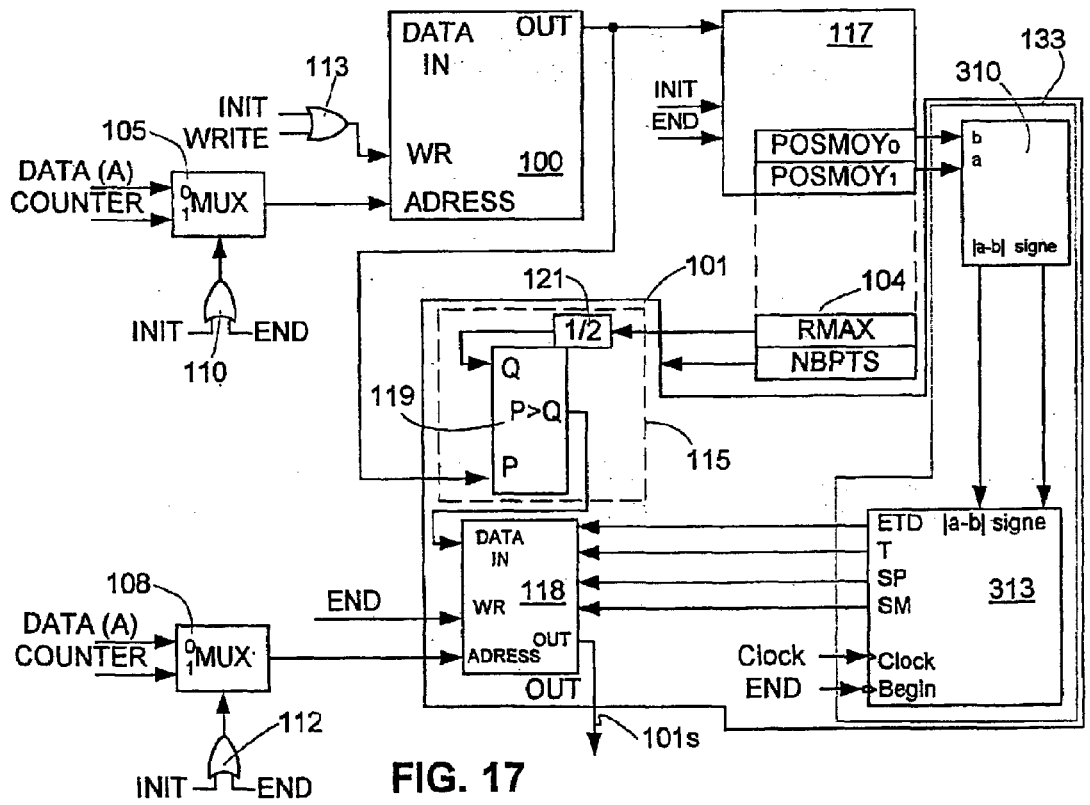
FIG. 17 is a diagram representing the essential elements of the self-adapting histogram calculation unit with anticipation according to a second method.
Figure 18:
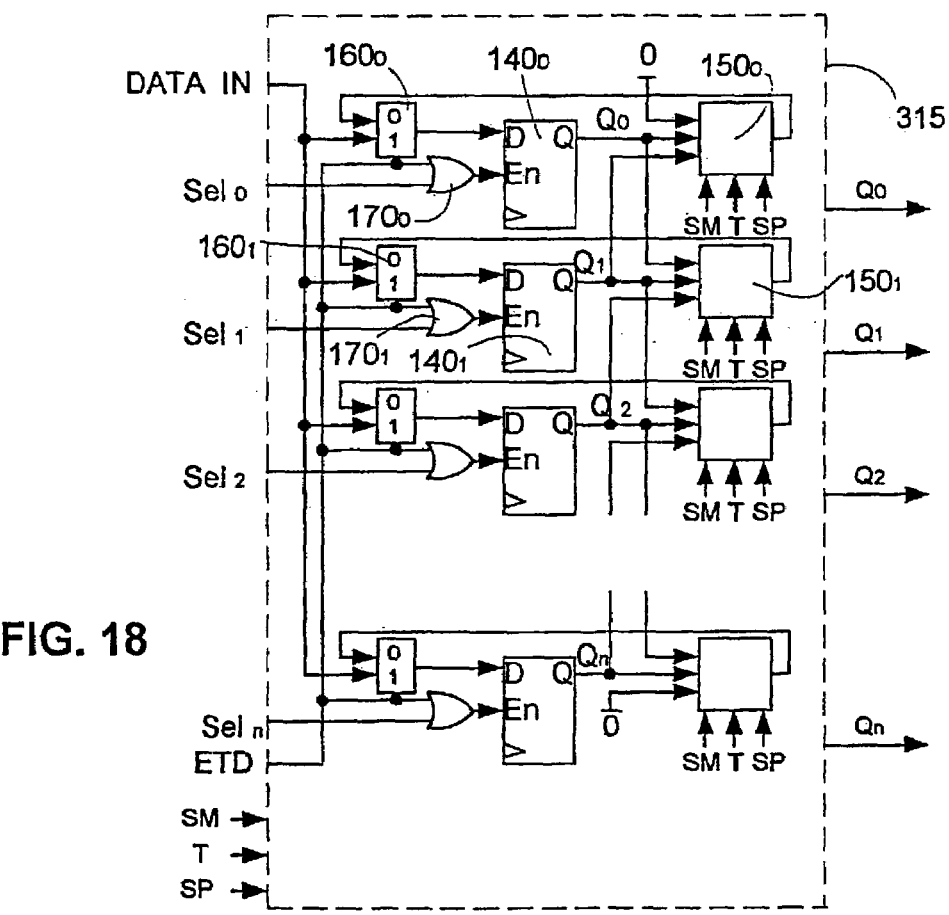
FIG. 18 is a detailed representation of the classifier memory with a bit-operated elementary calculation automaton.

This second method is represented on FIG. 17. The memory 118 is then represented in FIG. 18.

The general architecture of the memory 118 has been described above. A sequence for a given bit will now be described, wherein the sequence for the other bits are analogous. The elements common to FIG. 16 bear the same reference numbers.

The register $140_1$ is associated with a 2/1 input multiplexer $160_1$ which receives on one of its inputs, the binary signal output from the comparator 119 and on its other input, the output signal of the anticipation calculation automaton $150_1$.

The input multiplexer $160_1$ is controlled by the signal ETD that also controls the writing.

To this end, the writing command of the register $140_1$ is connected to an operator OR $170_1$ which receives, on one of its inputs, the signal ETD and on the other, a signal $Sel_1$.

At the output of the register $140_1$, an anticipation calculation automaton $150_1$ receives at input the three output signals $Q_0$, $Q_1$ and $Q_2$, from the registers $140_0$, $140_1$, $140_2$ of order, respectively, 0, 1, 2, it is commanded by the signals SM, SP and T.

In the automatons $150_0$, $150_1$, . . . $150_n$, the anticipation is performed by the succession of expansion operations followed by erosion operations.

Figure 19:
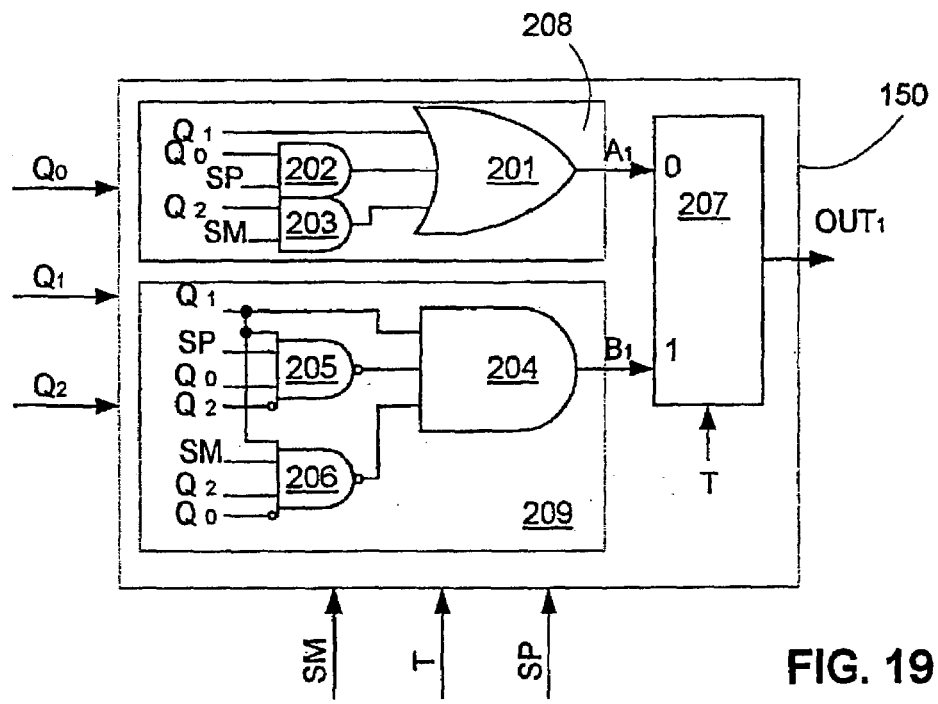
FIG. 19 is a representation of an elementary anticipation calculation automaton.

The anticipation calculation automaton 150 is described in detail on FIG. 19. It comprises a multiplexer 207 including one output and two inputs and is controlled by the signal T.

One of its inputs is connected to an expansion operator 208, which supplies a signal $A_1$, and the other input is connected to an erosion operator 209, which supplies a signal $B_1$.

The expansion operator 208 comprises a three-input and one-output circuit OR 201. Its output is connected to the multiplexer 207.

Its first input is fed by the signal $Q_1$, its second input is fed by the output from a two-input circuit AND 202, whereof one of the inputs is the signal $Q_0$ and the other input is the signal SP. The third input of the circuit OR 201 is fed by the output of a two-input circuit AND 203, whereof one of the inputs is the signal $Q_2$ and the other the signal SM.

The function fulfilled by the expansion operator 208 is thus:

$$A_1 = Q_1 + Q_0 \times SP + Q_2 \times SM.$$

The erosion operator circuit 209 comprises a three-input and one-output circuit AND 204. Its output is connected to the multiplexer 207.

Its first input is fed by the signal $Q_1$.

Its second input is connected to a four-input and one-output circuit NOT-AND 205.

The first input of this circuit NOT-AND 205 is connected to the signal SP, the second to the signal $Q_1$. The third input is connected to the signal $Q_0$, and the fourth input is connected to the inverse of the signal $Q_2$.

A second operator NOT-AND 206 has four inputs and one output connected to the third input of the circuit AND 204, wherein the first of these inputs is fed by the signal $Q_1$, the second by the signal SM, the third by the signal $Q_2$ and the fourth by the inverse of signal $Q_0$.

The function fulfilled by the erosion operator 209 is thus:

$$B_1 = Q_1 \times (SM \times \overline{Q_2} Q_0) \times (SP \times \overline{Q_2} \times Q_0)$$

Figure 20:
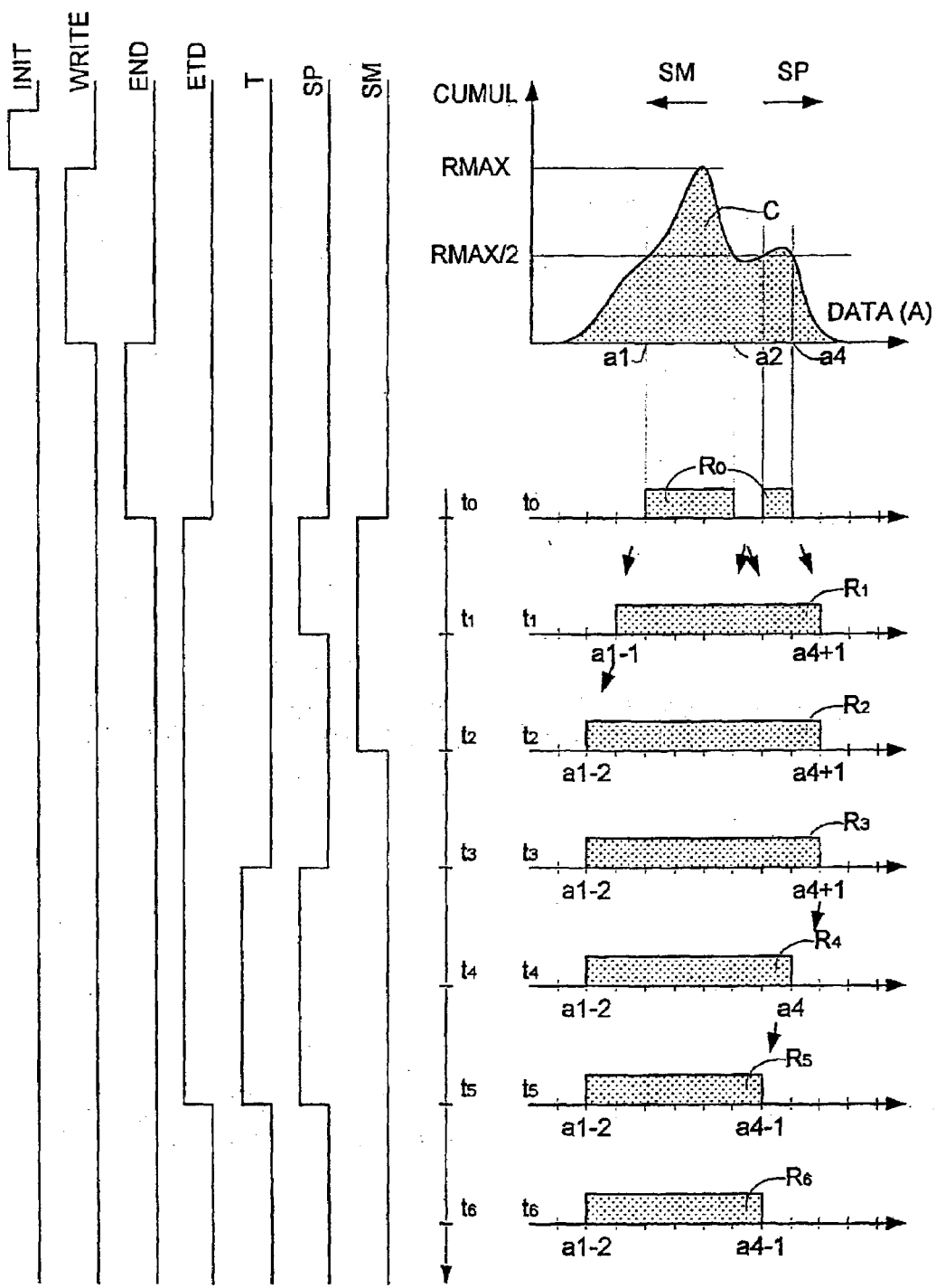
FIG. 20 is a schematic representation of the anticipation process.

The operation of the anticipation operator is illustrated on FIG. 20.

On this Figure, on the left with reference to the time axis t, are represented the signals INIT, WRITE, END, ETD, T, SP, SM.

The signal INIT, generated by the sequencer 9, starts the processing cycle of a frame. Throughout its duration, all the memories and registers are initialised.

The signal WRITE, also generated by the sequencer 9, follows the signal INIT and controls the statistical calculations for the frame considered whose data is represented by the curve C, whereof the axes represent in abscissa the values of the parameter and in ordinate the number of occurrences.

The test unit 103 looks for the maximum number of occurrences RMAX.

At the end of the signal WRITE, the signal END, generated by the sequencer 9, enables the update of the memory of the classifier 118. The new data is generated by the comparator 119.

At the end of the signal END at the time to, the content of the memory 118 is represented by the distribution $R_0$.

The end of the signal END starts the signal ETD whose duration is determined by the command generator 313. This signal ETD enables the calculation of the range in the memory 118 of the classifier.

The signals SP (Plus-direction) and SM (Minus-direction) comprised in ETD control, respectively, the processing in the positive direction (SP=1) and in the negative direction (SM=1) of the range of the distribution $R_0$ that becomes $R_1$ at $t_1$, $R_2$ at $t_2$ and $R_3$ at $t_3$, etc.

Thus, the respective durations of SP and SM determine the range of the position of the distribution $R_5$ at the end of the signal ETD.

The multiplexer 207, which is controlled by the command T, has two inputs which are supplied respectively by the outputs of the expansion and erosion operators, and one output, to implement either of these operators in relation to the command T.

The output of the multiplexer 207 is $OUT_1$:

$$OUT_1 = A_1 \times \overline{T} + B_1 \times T$$

XI. Time Coincidences

In a simplified embodiment described until now, the time coincidences block 102 comprises a single register contained a single time coincidences value making up the time coincidences criterion R.

A. Complex Time Coincidences Criteria

In a preferred embodiment, the time coincidences block is a memory that may contain several values forming together the time coincidences criterion R, any of which is capable of enabling the information carried by a pixel. Each of these values is stored in memory in its product term register 410.

Figure 22:
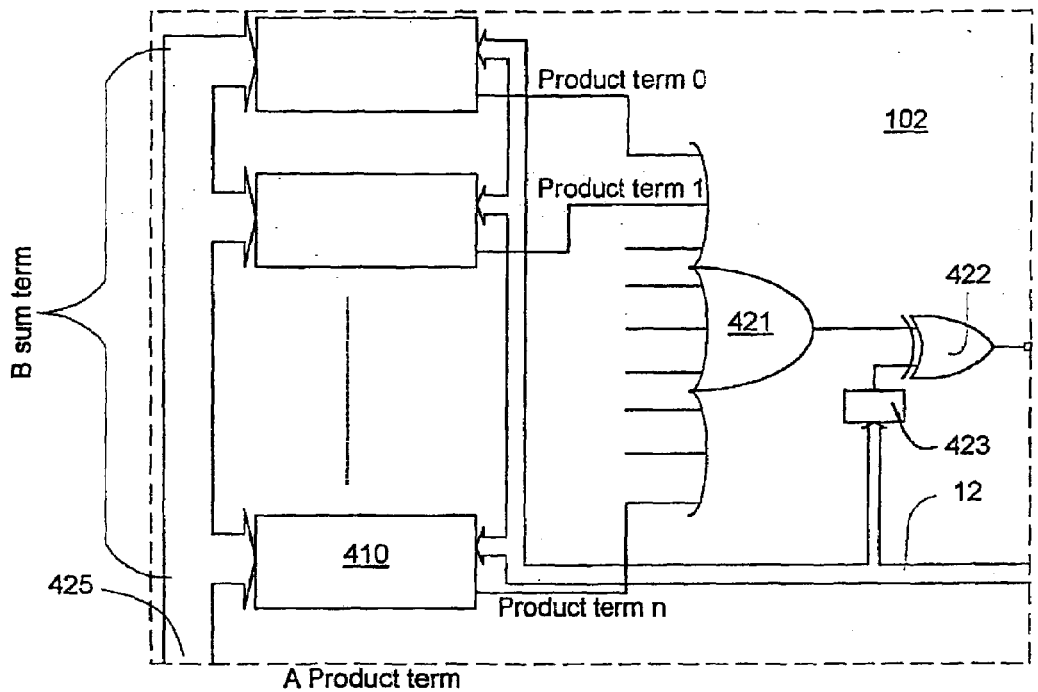
FIG. 22 is a representation of the time coincidences unit.

FIG. 22 represents a time coincidences block 102 in its entirety. It is composed of a plurality of product term registers 410 supplied by the bus 425 A 'PRODUCT TERM' and controlled by the bus Program Register 12.

Each of these product term registers 410 has one output that supplies an operator OR 421 that provides at output a signal fed into one of the inputs of a controlled inverter 422, which receives on its second input the signals from the bus Program Register 12 via the register 423.

Figure 23:
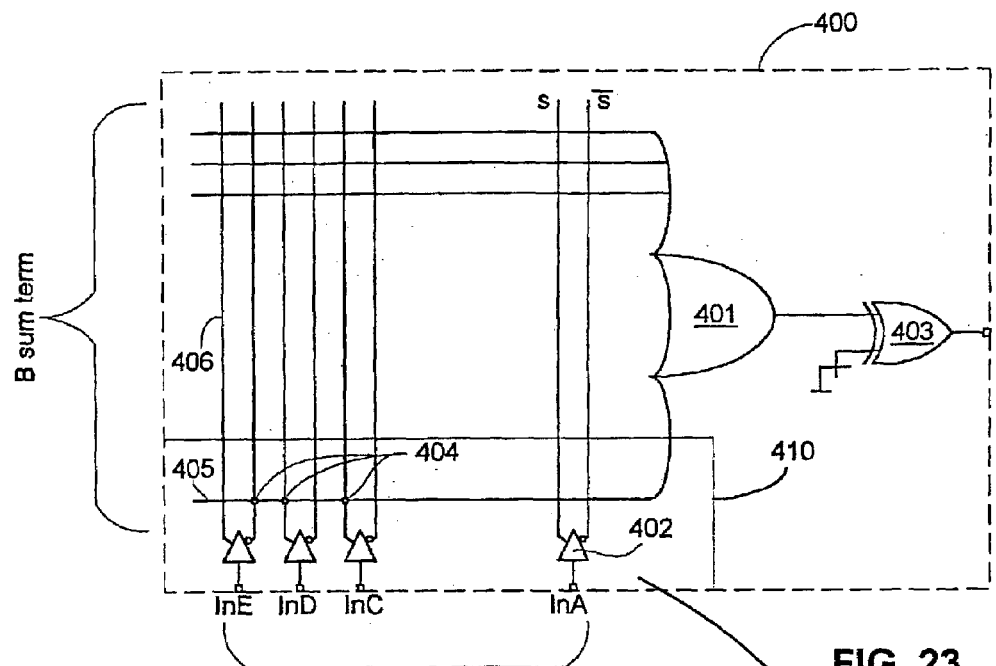
FIG. 23 is a flow chart representation of a field programmable gate array (FPGA) used as a time coincidences unit.
Figure 24:
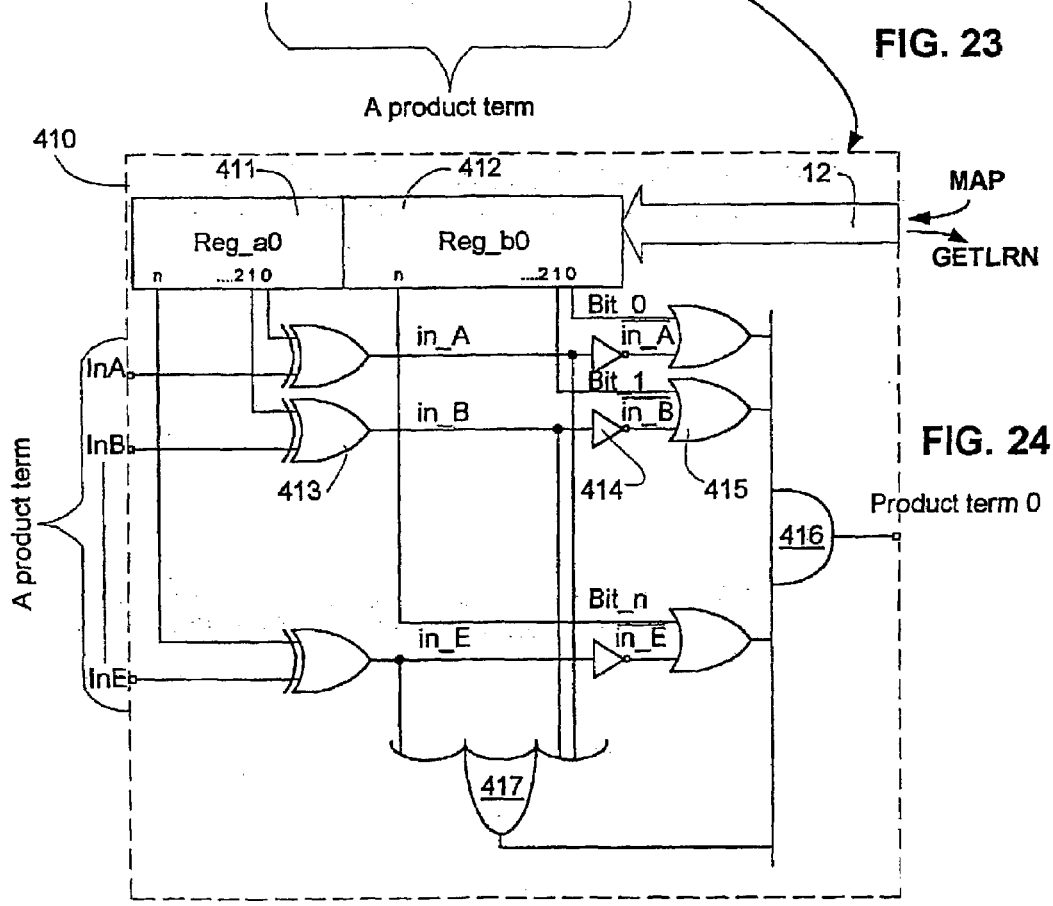
FIG. 24 is the register-based representation, limited to one row of the system, of FIG. 23.
Figure 25:
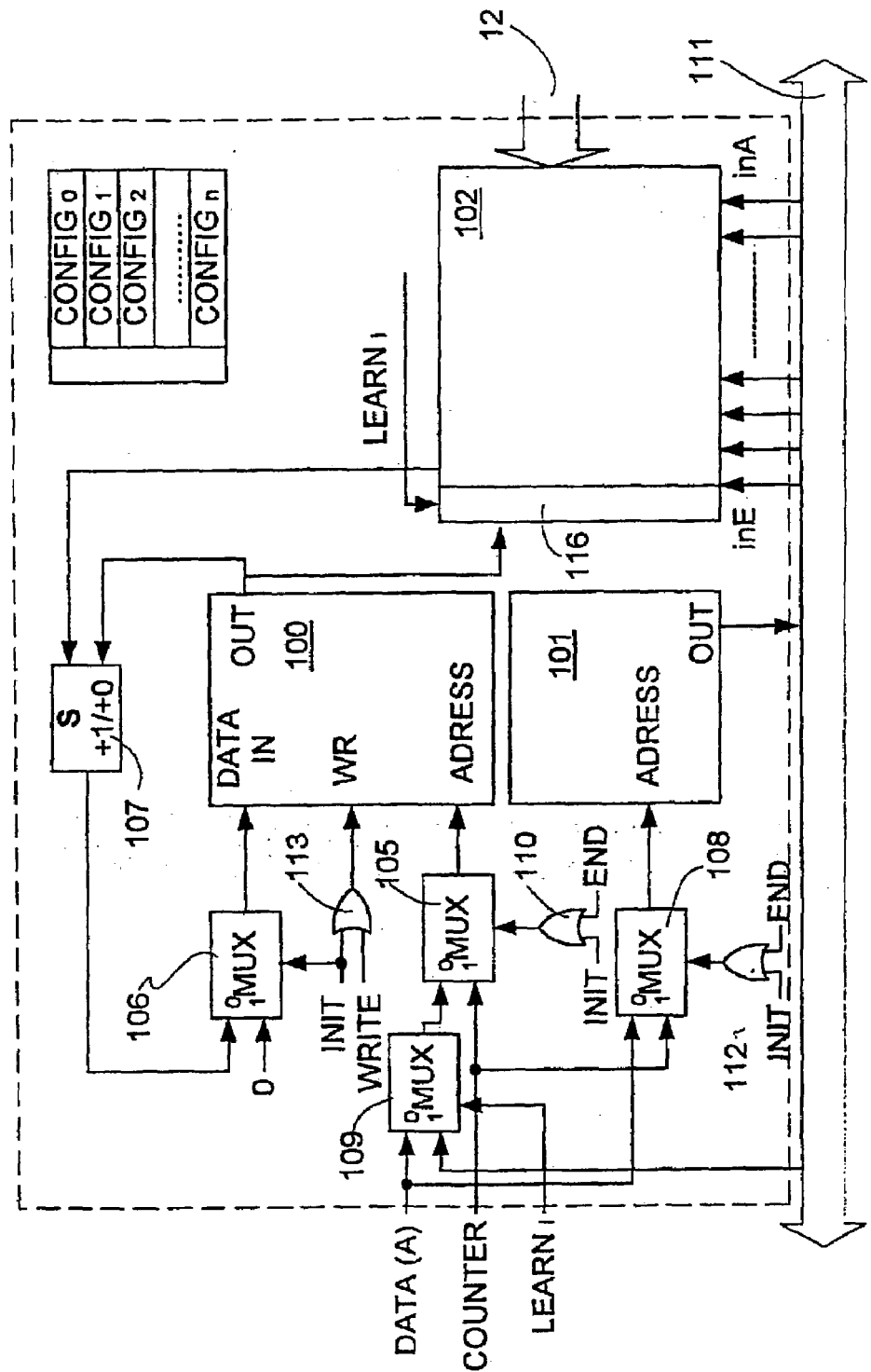
FIG. 25 is a representation of the essential elements of a histogram calculation unit with a learning functionality.

FIGS. 23 and 24 illustrate a Field Programmable Gate Area (FPGA) 400 implemented for the time coincidences block 102.

Such a memory comprises a controlled inverter 403 whose output is the output of the reprogrammable unit 400 and one of whose inputs is an operator OR 401 connected to the B lines 405, wherein these lines intersect the columns A 406 that are connected to amplifiers 402 supplying signals s and $\bar{s}$.

The intersections 404 of the lines 405 and of the columns 406 are programmable connections enabling to determine the whole operation of the reprogrammable unit 400.

FIG. 24 represents a single line 410 of such a reprogrammable unit 400.

Such a line 410 comprises registers 411 and 412 for receiving programming variables Reg-a0 and Reg-b0.

This line can be broken down into A elementary function blocks each of which comprises a controlled inverter 413, an operator OR 415 and an inverter 414. One of the inputs of the controlled inverter 413 is connected to the corresponding input A and the other input to the corresponding bit i of the register Reg-a0.

The output of this controlled inverter 413 is connected to the input of the inverter 414 that supplies, through its output, one of the inputs of the operator OR 415.

The other input of this operator OR 415 is supplied by the corresponding bit i of the register Reg-b0.

The output of the controlled inverter 413 also supplies one of the inputs of an operator OR 417 that receives, additionally, all the corresponding signals produced by the different outputs of the elementary functions.

An operator AND 416 whose output is product term0 receives at input the output of the operator OR 417 on the one hand and the outputs of the different elementary functions on the other hand.

B. The Learning Mode

The time coincidences block can be programmed externally by an instruction given by an application management interface. This interface loads the registers 411 and 412.

In a still preferred embodiment, the histogram constitution unit 1, in addition to updating the classifier and for anticipation, has a learning function.

To this end, the histogram constitution unit 1 comprises a learning multiplexer 108 which enables automatic programming of the time coincidences unit 102.

The learning multiplexer 109 selects either of both possible operating modes (processing and learning). In processing mode, the values contained in the register of the time coincidences unit 102 are set, and conversely, in the learning mode, these values are updated.

The Processing Mode

When operating in processing mode, the learning multiplexer 109 transmits, on its output, a signal of value 1 indicating that the values contained in the registers of the time coincidences block 102 are not modified during the operating sequence in processing mode.

The values stored in these registers have therefore been selected and stored by the user, or they may have resulted from a previous learning phase as will be discussed below.

The time coincidences unit 102 also receives, from the other histogram calculation units co-operating with that described herewith, comparable signals inE . . . inA.

Fulfilling its role already described above, this time coincidences unit compares the values thus received to the values stored in its register(s) and outputs a signal 102s equal to 1 in case of coincidence and equal to zero in the reverse case. This enabling signal is sent to the incrementation enabling unit 107 and when its value is equal to 1, authorises taking into account the value of the parameter DATA(A) of the pixel affected in the analysis memory 100 and, conversely, when the value of the enabling signal is zero, processing proceeds to the following next.

The Learning Mode

The operation of the histogram calculation unit is controlled by signals represented on FIG. 5, i.e. an initialisation signal (INIT), a writing signal (WRITE), that carry the information corresponding to each pixel in the frame (or the image) and an end signal END.

In the learning mode, the learning multiplexer 109 outputs the value of the time coincidences signal that is then used instead of DATA(A).

In the learning mode of an i-order histogram calculation unit, a signal $LEARN_i$ enables throughout a frame sequence the processing in the learning mode.

During this sequence, the learning registers 116 are updated. Simultaneously, the time coincidences block 102 ensures transparency of the signals, enabling the DATA(A), then equal to the time coincidences signal 111 as soon as at least one of the inputs inA, . . . , inE is active (=1).

At the end of the signal WRITE, the histogram memory 100 represents the distribution of the time coincidences signal.

The test unit 103 then generates a classification of the occurrences by decreasing value equal in number to B 'SUM TERM'.

During the signal END, the values of the time coincidences signal thus selected are written into the registers 411 and 412 of each block 410 in the time coincidences block 102.

The register 412 corresponds to the value of the time coincidences signal and the register 411 corresponds to its complement. In practice, two outputs of the same register can be used, supplying both these values.

Thus, automatic statistical elaboration of the key-parameters is performed in the frame studied.

Thus, the learning calls, for n input parameters, n+1 histogram calculation units. The n blocks process one of the parameters and the remaining block process the time coincidences information to perform the learning function. In practice, the time coincidences information having a sizeable number of digits, whereas the learning unit is dedicated and is of larger size.

The flow charts of the various software packages necessary to fulfil the self-adapting, anticipation and learning functions represented on the figures are self-explanatory and do not call for any digression to be understood by one skilled in the art. When, internally, they refer to variables, said variables have been represented within a box. As certain functions are realised in a particular component described herein, the numeric reference of this component has also been allocated to the function.

XII. The Spatial and Temporal Processing Unit

Advantageously, the spatial processing unit 6 outputs various signals F, SR, V, VL, DI, and CO, each associated with each pixel in a synchronous fashion. These are preferably digital signals. The complex signal F comprises a number of output signals generated by the system preferably including signals outlining the presence and the location of a zone or a moving object, V is the velocity of the oriented direction of the displacement DI of each pixel in the image. Also, preferably, an output of the system consists of the input digital video signal which is delayed (SR) in order to synchronise it with the output ZH of the frame, while taking into account the calculation time of the compound data signal F (for a frame). The delayed signal SR is used to represent the image received by the camera on a monitor or a television screen that may also be employed to represent the information contained in the compound signal ZH. The compound signal ZH can also be transmitted to a separate processing unit 10a for further processing.

XIII. Spatial Processing: Choice of Axes

The position of a pixel in space is represented with respect to a system of axes. According to the shape, the orientation, etc. of the objects in the scene, certain systems of axes supply better results than others.

Figure 26:
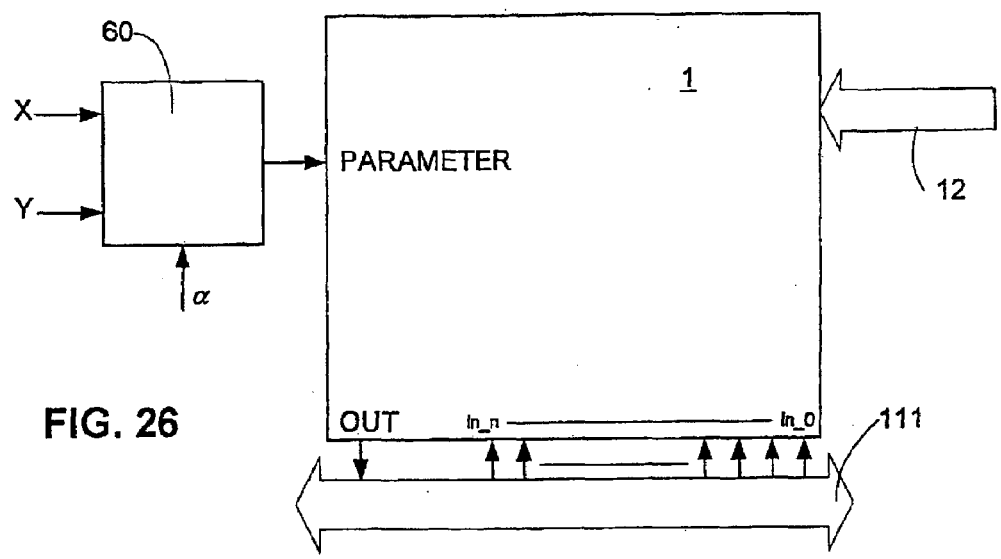
FIGS. 26 and 27 are schematic representations of a particular axis selection.
Figure 27:
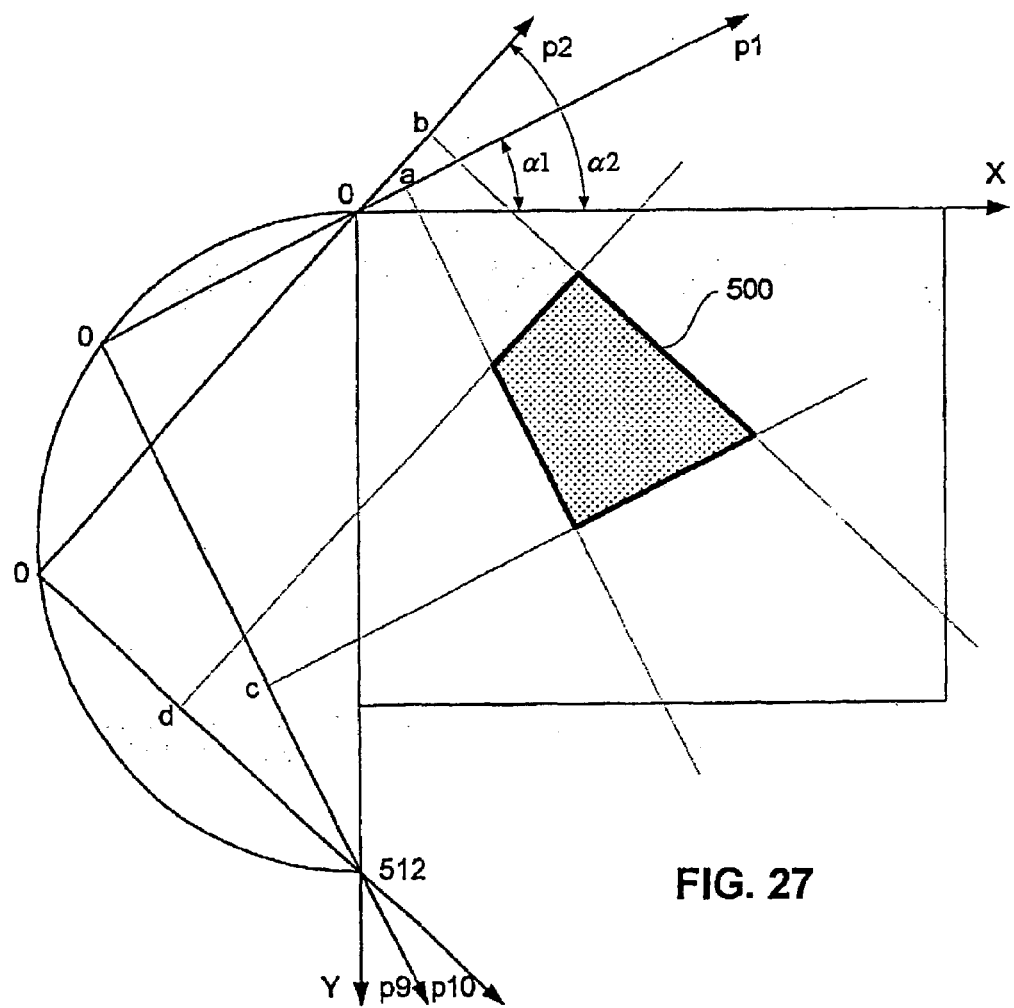

FIGS. 26 and 27 illustrate the procedure for choosing axes enabling to obtain optimised histograms, i.e. exhibiting a clearly defined maximum value.

The Space transform unit receives at input the spatial data x and y that may be either Cartesian or polar data. This Space transform unit is controlled by a signal a and, for each value of α, outputs a parameter that feeds a histogram constitution unit according to the invention.

The program controlling this histogram calculation unit launched by the Program Register enables selection of the value α so as to produce an optimised histogram.

Figure 11:
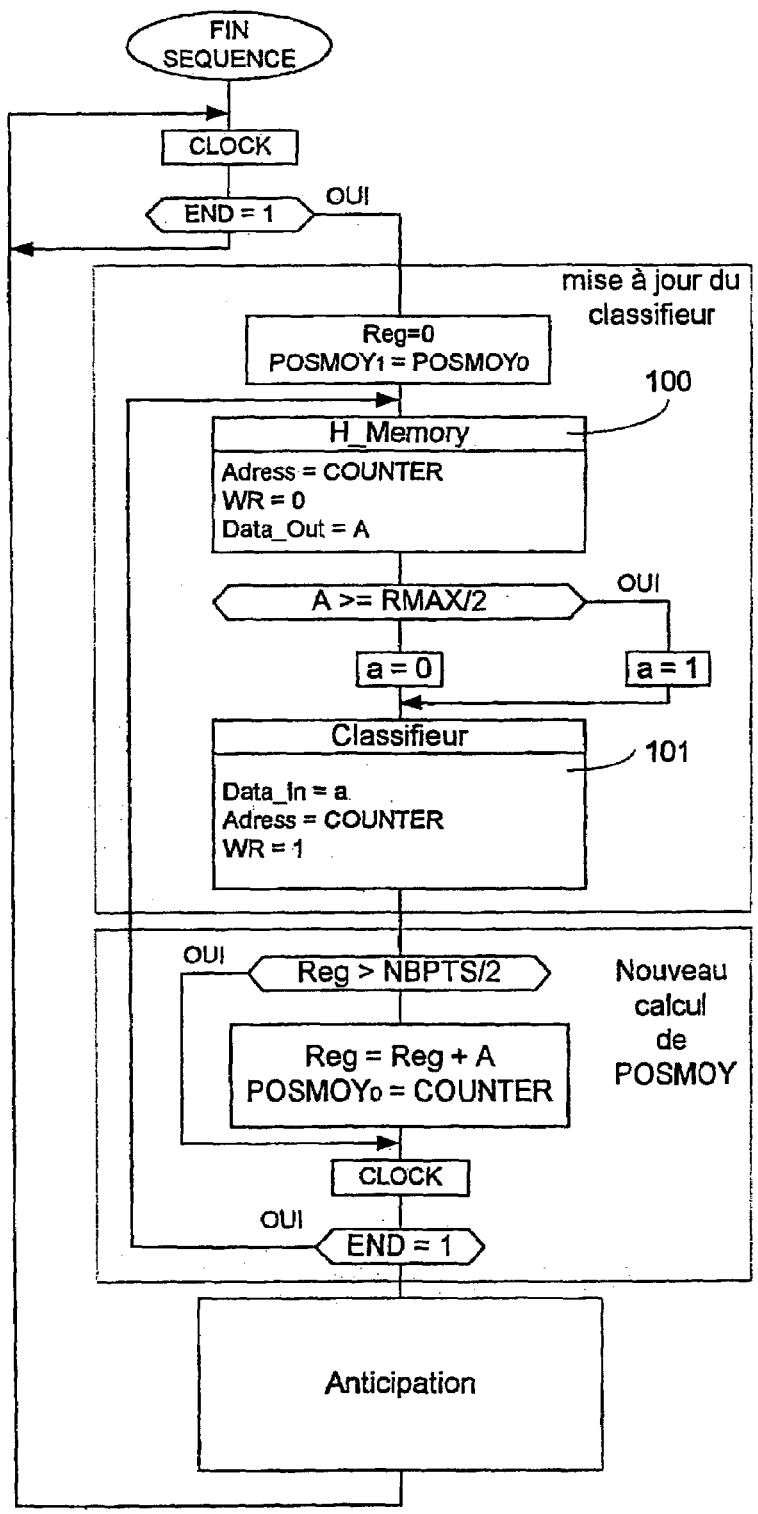
FIG. 11 is a flow chart of the end of the processing (use of the command 'END')

Such a method for selecting the appropriate axes has been described in detail in the application PCT WO-98/05002 (see FIG. 11 and the corresponding description, here the 'Space Transform' unit is referred to as 37).

XIV. Temporal Processing

The colorimetric processing of the values given by the tone (hue), saturation and luminance signals, as well as the velocity, direction and intensity signals can be added a spatial filtering function that produces a spatial resolution parameter (the Gabor method) and a binocular function that, via a distance calculation automaton, supplies a depth parameter.

Complete applications can be realized while processing, in whole or in part, these various parameters.

XV. Visualization of the Statistical Curve

According to a preferred embodiment, a curve generator 114 enables on screen-overlay of a curve of the values DATA for the frame processed previously.

Similarly, a screen overlay of the time coincidences signal is possible.

These overlays are sent respectively by the lines 14 and 15 to a screen. Switches 16 and 17 enable selection of a particular histogram calculation unit from among the various histogram processing units.

Figure 28:
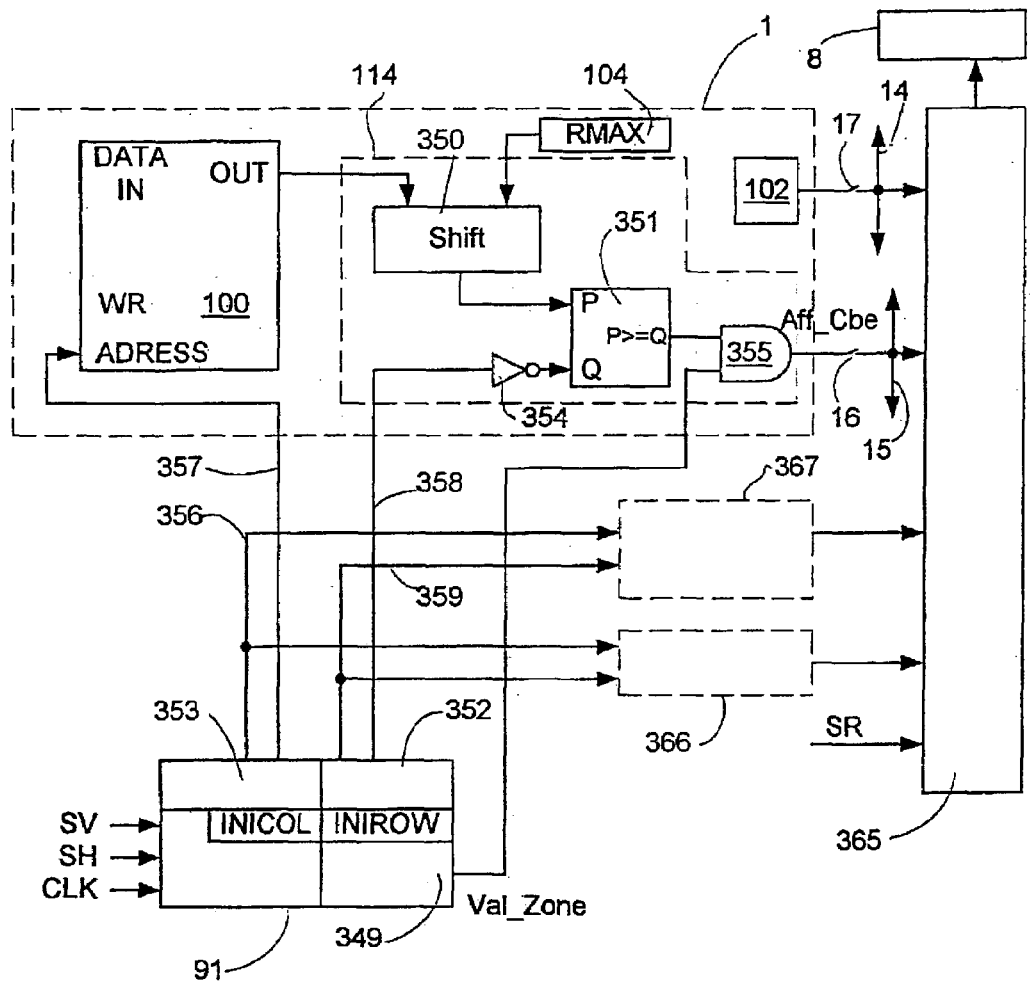
FIG. 28 is a schematic representation of the statistical visualisation device.
Figure 29:
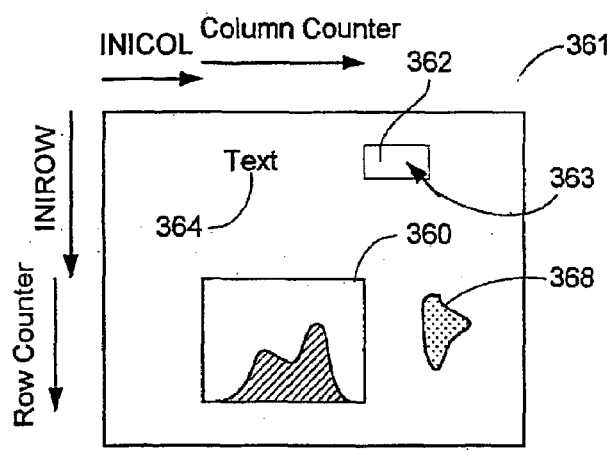
FIG. 29 is an example of the result obtained using the visualisation produced by the device of FIG. 28.

FIGS. 28 and 29 describe more precisely the visualisation means of the histogram curve.

The memory 100 addressed by the value of the column counter 353 feeds one input of a shift register 350 whose other input is supplied by the parameter RMAX generated by the analysis register 104.

The output of this shift register 350 supplies one input of a comparator 351 whereof the other input is fed by a line counter 352 via an inverter 354. An operator AND 355 receives, on the one hand, the result of the comparison $P \geq Q$ and, on the other hand, the variable Val_Zone outputs the variable Aff_Cbe.

The column counter 353, which generates the variables 'Col_Counter' 356 and 'Col_Curve_Counter' 357, the line counter 352, which generates the variables 'Row_Curve-_Counter' 358 and 'Row_Counter' 359, and the generator of the variable Val_Zone constitute a sub-assembly 91 of the sequencer 9.

Moreover, the visualisation control block 365 of the screen 8 receives the delayed video signal SR, a cursor command produced by the cursor block 366, and a command produced by the semi-graphic memory 367.

FIG. 29 is the result of the stamp obtained 360 and enabled by the switch 16 that transfers the curve display signal to the overlay command 15 in the screen 361 that comprises moreover a command box 362, a cursor 363 and a text box 364.

Thus, this screen and the associated mouse constitute a graphic user interface (GUI) enabling the user to generate and to command the application.

Similarly, the time coincidences function can be visualised, dynamically, in the form of pixels 365, by actuating the switch 17 on the time coincidences overlay command 14.

XVI. Applications

FIG. 30 and the following ones illustrate the implementation of a set of histogram calculation units enabling the management of any number of parameters A, B, C, D, E . . . The association of spatial (generally two in number) as well as temporal (at least one) parameters enables modelling a spatial-temporal neurone. The temporal 5 and spatial 6 processing units receive on the one hand the signal S(t), on the other hand, the CLOCK and synchronisation ST, frame synchronisation and SL, line synchronisation.

As represented in FIGS. 4 and 30, each parameter A, B, C, D, E . . . from temporal and spatial processing units 5 and 6 feeds a histogram calculation unit, respectively $1_A$, $1_B$ . . . $1_E$. The time coincidences generated by the set of classifiers 102 is available on the bus 111 and used as a whole by each of the histogram calculation units, respectively $1_A$, $1_B$ . . . $1_E$.

For exemplification purposes, A, B, C, . . . , E can represent respectively the colour components of the input pixel, i.e. luminance L, tone T and saturation S. D and E can represent the co-ordinates $P_1$ and $P_2$ of the pixel considered in an optimised axis system.

Figure 31A:
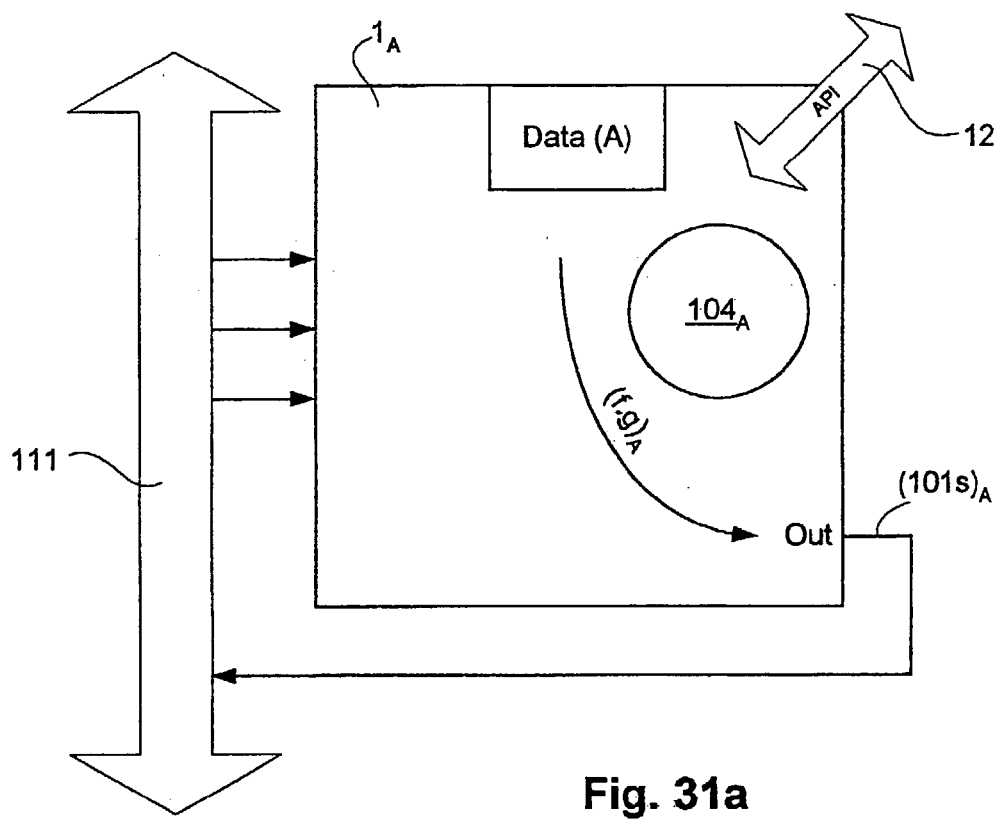
FIG. 31a is the representation of a histogram calculation unit; also called electronic spatio-temporal neuron.

In summary, as represented on FIG. 31a, for the parameter A, each histogram calculation unit $1_A$, $1_B$, . . . , $1_E$ processes one of the data DATA(A), DATA(B), . . . , DATA(E) by the corresponding function $(fog)_A$ . . . to produce individually an output value $(101s)_A$ . . . and all together, the time coincidences available on the bus 111. At the same time, the analysis output register $104_A$ is fed.

The choice of the parameter processed by each histogram calculation unit, the contents of the analysis output register 104 and the function fog are determined by the A.P.I.

In the embodiment shown on FIG. 31, the different parameters DATA(A) . . . DATA(E) feed an input multiplexer 500 that is controlled by a register 501. The register 501 is updated by the command SELECT 502. The controlled learning multiplexer 503 receives, according to the state of the learning command of the histogram calculation unit i, LEARN$_i$, either the time coincidences information transmitted by the bus 111, or the information from the input multiplexer 500.

It is thus possible to use a single histogram calculation unit 1 to process any of the different parameters A, B, C . . . E that are addressed by a bus 510 in relation to the command SELECT.

According to the status of the learning command LEARN, The histogram calculation unit will operate either in the processing mode or in the learning mode.

The assembly 1a thus formed by a histogram calculation unit 1, an input multiplexer 500, its associated register 501, and optionally a learning multiplexer, constitutes a polyvalent histogram calculation unit.

FIG. 32 represents a complete device comprising, for exemplification purposes, a set of sixteen such polyvalent histogram calculation units.

These units 1a constitute a matrix, and are connected to a bus 510 on which the parameters D, V, S, T, L, p0, p1, . . . , p15 are available (p0, p1, p2, . . . , p15 in one embodiment are slopes of reference axes). The bus 111 carries the time coincidences information.

The application assembly is commanded by the control unit 513 which determines which of the parameters L, T, S, V, D, p0, p1, . . . , p15 are to be processed at a given time by one or several dedicated polyvalent histogram units and by the sequencer 9.

FIG. 40 represents a functional flow chart of an assembly comprising several histogram calculation units (as represented on FIG. 31) according to an embodiment of this invention. Each histogram calculation unit 1a is connected to a data bus 510 which supplies the different parameters to be processed, and to a bus 11 which provides the classification signal 101s and the learning function signals to the different units 1a. Each histogram calculation unit comprises a memory, a classifier and a time coincidences unit 102. Each unit 1a is capable of fulfilling automatic classification, anticipation and learning functions as described above.

The set of histogram calculation units 1 can operate either in processing mode while one or several of said units are in learning mode.

In a particular embodiment, a histogram calculation unit is used on a timeshare basis by several parameters during each frame, possibly stored in a memory, not represented.

For example, with reference to FIG. 31, the histogram calculation unit 1 calculates histograms and the corresponding statistics for two or more parameters (for example DATA(A) and DATA(C)) during each frame.

A multiplexer 500 provided in this embodiment is capable of multiplexing the different parameters. In such a fashion, a limited number of histogram calculation units us necessary to process a greater number of parameters, which enables to reduce the amount of silicium necessary to manufacture the useful number of histogram calculation units.

The Generic Visual Perception Processor (GVPP) 520 thus constituted can be integrated on a single solid state substrate.

The number of polyvalent histogram calculation units 1a depends on the application and on the solid state components manufacturing technologies available.

The 0.5 μm technology currently available enables the integration of 32 units economically. With breakthroughs in semiconductor processing technology, it has become possible to produce more and more histogram calculation blocks (e.g., blocks 1a in FIG. 32) on the same chip, and to perform more calculations on more samples (i.e., larger and larger numbers of samples per parameter).

Such an increase in calculation capability can be realised without an increase in complexity of the API, which is discussed below and illustrated in Appendix A in detail. For example, the same instruction set can operate a 20 block device as well as a 200 or a 2000 block device without any added complexity required.

In another embodiment represented on FIG. 39, a calculation unit 605 according to the present invention, e.g., similar to the calculation unit 520 of FIG. 32, is implemented to process parameters associated with a perception domain other than the visual perception domain. As illustrated on FIG. 39, the techniques of the present invention can be applied to analysing oral or sound, for example for voice recognition and voice-to-text (inputting a text into a computer vocally). On FIG. 39, a sound signal generating device provides sound signals to the calculator 605, which then provides an output signal.

In one embodiment, the signal generating device includes a microphone 600, but it may include any device capable of providing analogue or digital signals, for example, a CD or DVD player . . . The signal generating device preferably provides digital signals, and may operate in a slave mode or a master mode similar to signal generator assembly 2 of FIG. 1. The processor 605 receives the signals and processes various parameters of the sound signal. Such parameters include frequency, amplitude and phase. The phase and amplitude parameters are analogous to the visual spatial and temporal parameters, respectively, that are processed for visual scenes. The processor 605, provides signals to the device 610 so as to display the results. For example, in one embodiment, the device 610 includes a printer for printing out text associated with signals provided by the signal generating device 600. Likewise, the device 610 may include a monitor or any other text generating device.

FIG. 33 is the representation of a generic visual perception processor 520 or 530 receiving information from a CMOS imaging device 521 including a retina 522 and a sequencer 523.

FIG. 34 represents a complete system capable of being a complete application operating with several CMOS imaging devices. The association of two CMOS imaging devices 531, 532 represented on FIG. 35 enables acquisition of information on the depth in the scene observed.

In certain usages, it is desirable to be able to observe certain shots of a scene, in depth and this explains why the retina is fitted with a variable focal device as represented on FIG. 36.

FIG. 37 is a schematic representation of a system composed of a set of polyvalent histogram calculation units, capable of processing information originating from three directions, respectively V1, V2 and V3 that can represent a three-dimensional space. It is thus possible to manage volume perception data, for example, for use in robotics applications.

XVII. Application Program Interface (A.P.I.)

The application program interface (A.P.I.) represented on FIG. 38 enables to provide a complete system or a general visual perception processor including a number of polyvalent histogram calculation units, with the set of external parameters that it requires. Its dynamic configuration is thus ensured. Appendix A, which is provided as an integral part of this document, includes a functional block diagram of the Spatial-temporal API, the graphical user interface (GUI) API, the mouse API and the I/O API, as well as the various API commands associated therewith.

Each command mnemonic is associated with an index i corresponding to the number of the polyvalent histogram calculation unit for which it is intended. Each mnemonic can be accompanied by configuration parameters.

Each mnemonic enables allocating the parameters DATA (A) . . . DATA(E) to real parameters of the scene observed. Certain of the commands are as follows:

SELECT enables to allocate a parameter DATA(A) to a determined unit.

LEARNi enables to perform the learning function for a polyvalent histogram calculation unit i.

START ensures initialisation of a polyvalent histogram calculation unit. This command configures the memory 118 of the classifier 101.

STOP stops the polyvalent histogram calculation unit. It is used as soon as a histogram calculation unit is inactive. The overall energy consumption is thereby reduced.

AFCURV is the curve validation command that controls the switch 16 represented on FIG. 4. Its inverted command is CLCURV.

AFMAP is the validation command of the time coincidences controlling the switch 17. Its inverted command is CLMAP.

MAP is the writing command of the registers 411 and 412 of the time coincidences unit 102.

GETLRN is the command ensuring collection of the content of the time coincidences registers 411 and 412 after the learning process.

APPENDIX A

API specifications (Application Programming Interface)
Application programming interface (API)
For the Generic Visual Perception Processor: (GVPP)
The interface comprises 4 subdivisions for GVPP:
 A spatio-temporal block API
 A graphic API
 A mouse management API
 An API for managing communications with the peripheral devices
API
Spatio-temporal block
Graphic API
Generic User Interface (GUI)
Mouse API
Generic User Interface (GUI)
Inputs/outputs API APPENDIX A-continued Description of the application programming commands Spatio-temporal block API It regroups all the generic functions used to initialise, configure or learn and start the block as well as the functions to collect the calculation results. The name of the command is followed by the necessary parameters written into defined registers.

Functions:

START:

| | |
|---|---|
| Role: | To start the calculation of a block |
| Parameters: | Number of the block affected, value MIN, value MAX for initialisation. |
| Prototype: | |

```
Block3      equ   03
MIN    equ   10
MAX    equ   100
START Block3 MIN MAX
Input-      R0:      Number of the block
            R1:      Value MIN
            R2:      Value MAX
Output-
```

STOP:

| | |
|---|---|
| Role: | To stop the calculation of a block |
| Parameters: | Number of the block affected. |
| Prototype: | |

```
Block3      equ   03:   Equivalence Block3 is equal to
                         the value
STOP Block3
Input-      R0:      Number of the block
Output -
```

SELECT:

| | |
|---|---|
| Role: | To select the input signal of a block. For example luminance, tone, saturation, orientation of the lines on the plane, etc. |
| Parameters: | Number of the block affected, signal to be selected. |
| Prototype: | |

```
Block3      equ   03
LUM    equ   00
Input-      R0:      Number of the block
            R1:      Input parameter
Output-
```

GET:

| | |
|---|---|
| Role: | To collect the calculation results. |
| Parameters: | Number of the block affected, parameter(s) to be collected. |
| Prototype: | |

```
Block3           equ      03
MIN         equ   00
MAX         equ   01
RMAX        equ   02
POSRMX      equ   03
POSMOY      equ   04
NBPTS       equ   05
...
GET Block3 NPTS
Input-      R0:      Number of the block
            R1:      Input parameter
Output-     R0:      Value resulting from this
                     parameter
```

LEARN:

| | |
|---|---|
| Role: | A block switches to the learning mode. |
| Parameters: | Number of the block affected |
| Prototype: | |

```
Block3      equ   03
LEARN Block3
Input-      R0:      Number of the block
Output-
```

MAP:

| | |
|---|---|
| Role: | Programming the block in relation to a previous learning mode to change context. Search for another event or object: writing the time coincide matrix of the block. |
| Parameters: | Number of the block affected. Logic combination of the other blocks associated; sum of product terms (AND and OR). |
| Prototype: | |

```
Block3      equ   03
MAP Block3 0F3 1AB 007
Input-      R0:      Number of the block
            R1:      First product term
            R2:      Second product term
            R3:      . . . continuation
Output-
```

GETLRN:

| | |
|---|---|
| Role: | To display the curve of a block. |
| Parameters: | Number of the block affected. |
| Prototype: | |

```
Block3      equ   03
AFCURV Block3
Input-      R0:      Number of the block
Output-
```

CLCURV:

| | |
|---|---|
| Role: | To delete the curve of a block. |
| Parameters: | Number of the block affected. |
| Prototype: | |

```
Block3      equ   03
CLCURV Block3
Input-      R0:      Number of the block
Output-
```

AFMAP:

| | |
|---|---|
| Role: | To display the time coincidences table of a block. |
| Parameters: | Number of the block affected: |
| Prototype: | |

```
Block3      equ   03
AFMAP Block3
Input-      R0:      Number of the block
Output-
```

CLRMAP:

| | |
|---|---|
| Role: | To delete the screen of the time coincidence table of a block. |
| Parameters: | Number of the block affected. |
| Prototype: | |

```
Block3      equ   03
CLRMAP Block3
Input-      R0:      Number of the block
Output-
```

Graphic API

CLRSCR:

| | |
|---|---|
| Role: | To delete the screen. |
| Parameters: | None |
| Prototype: | |

```
CLRSCR
Input
Output-
```

DPDATA:

| | |
|---|---|
| Role: | To display the data on the screen. |
| Parameters: | Data to be displayed and position on the screen. |
| Prototype: | |

```
DPDATA
Input-      R0:      ASCII code
            R1:      Position of the line
            R2:      Position of the column
Output-
```

Mouse management API

DPNTER:

| | |
|---|---|
| Role: | To move and display the cursor. |
| Parameters: | Co-ordonates. |
| Prototype: | |

```
DPNTER
Input-      R0:      Position of the line
            R1:      Position of the column
Output-
```

APPENDIX A-continued

BUTTON:

Role: To generate a cursor click.
Parameters: Button.
Prototype:
    BUTOON
    Input-
    Output-R0:   New position of the buttons
API for managing communications with the peripheral devices

MVCAM:

Role: To move the camera.
Parameters: Position and focus.
Prototype:
    MVCAM
    Input-    R0:   X position
           R1:   Y position
           R2:   Focus
    Output-

GETCAM:

Role: To collect the position of the camera.
Parameters: None.
Prototype:
    GETCAM
    Input
    Output-   R0:   X position
            R1:   Y position
            R2:   Focus

MVMOT:

Role: Engine action.
Parameters: Direction + number of steps.
Prototype:
    MVCAM
    Input-    R0:   Direction + number of steps
    Output-

GETMOT:

Role: Collects the current position of the engine.
Parameters: No
Prototype:
    GETMOT
    Input-
    Output-   R0:   Position

SENDPC:

Role: To send information to the PC.
Parameters: To point to the information and the amount of information.
Prototype:
    SENDPC
    Input-    R0:   Information pointer
           R1:   Amount of information
    Output-

Figure 6:
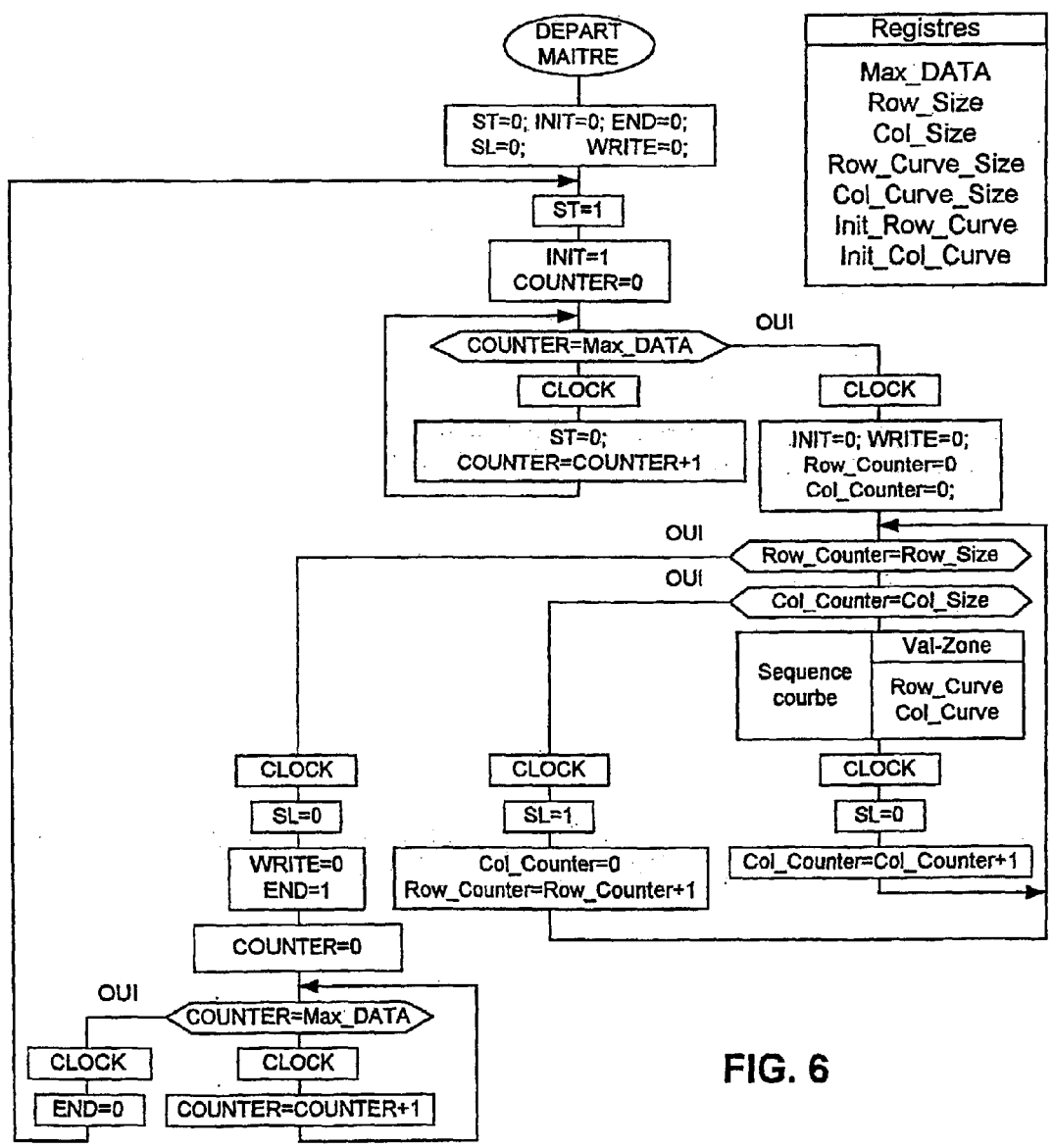
FIG. 6 is the flow chart of the software controlling the calculation unit of FIG. 4 in master mode.
Figure 7:
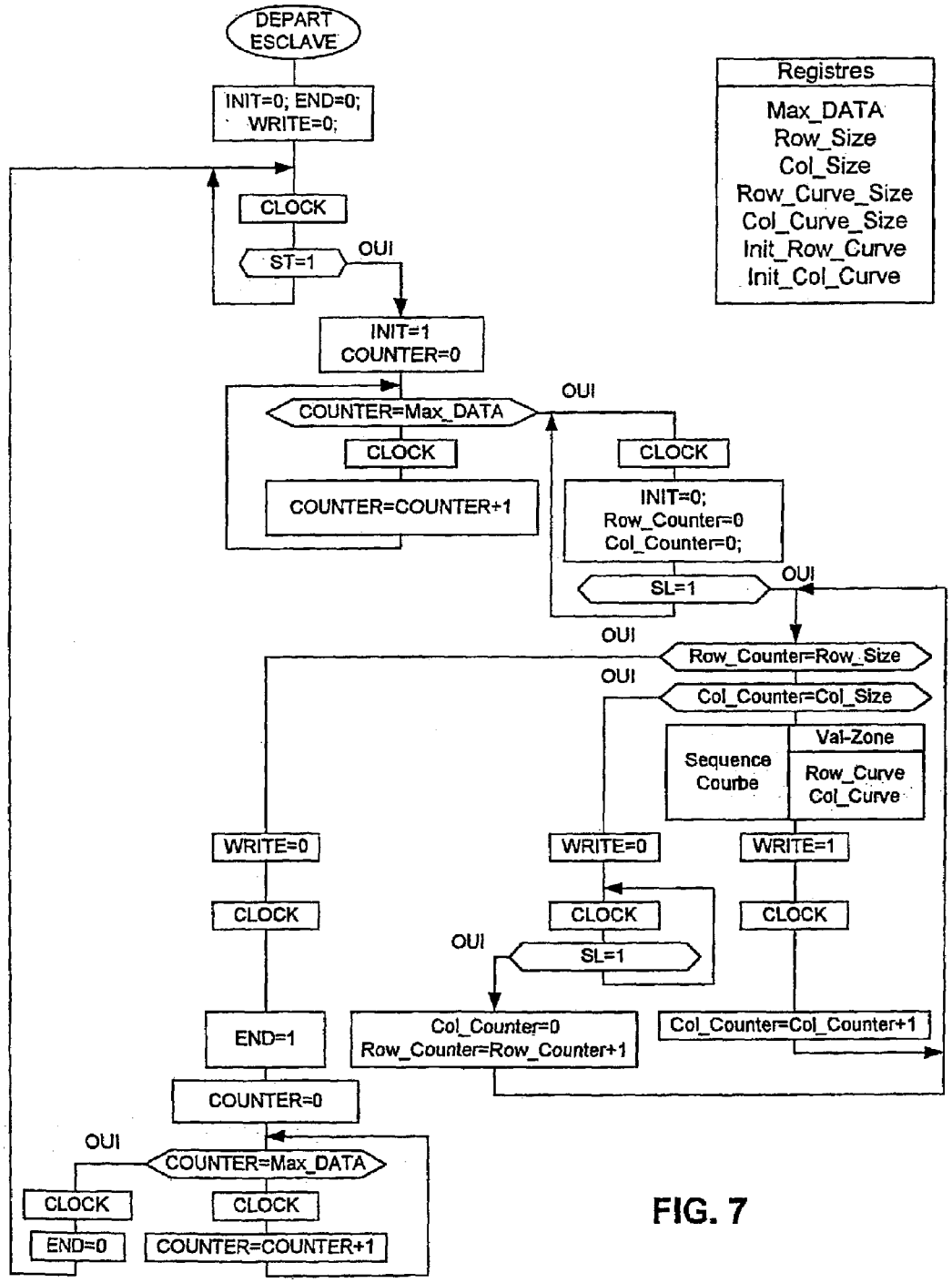
FIG. 7 is the flow chart of the software controlling the calculation unit of FIG. 4 in slave mode.
Figure 8:
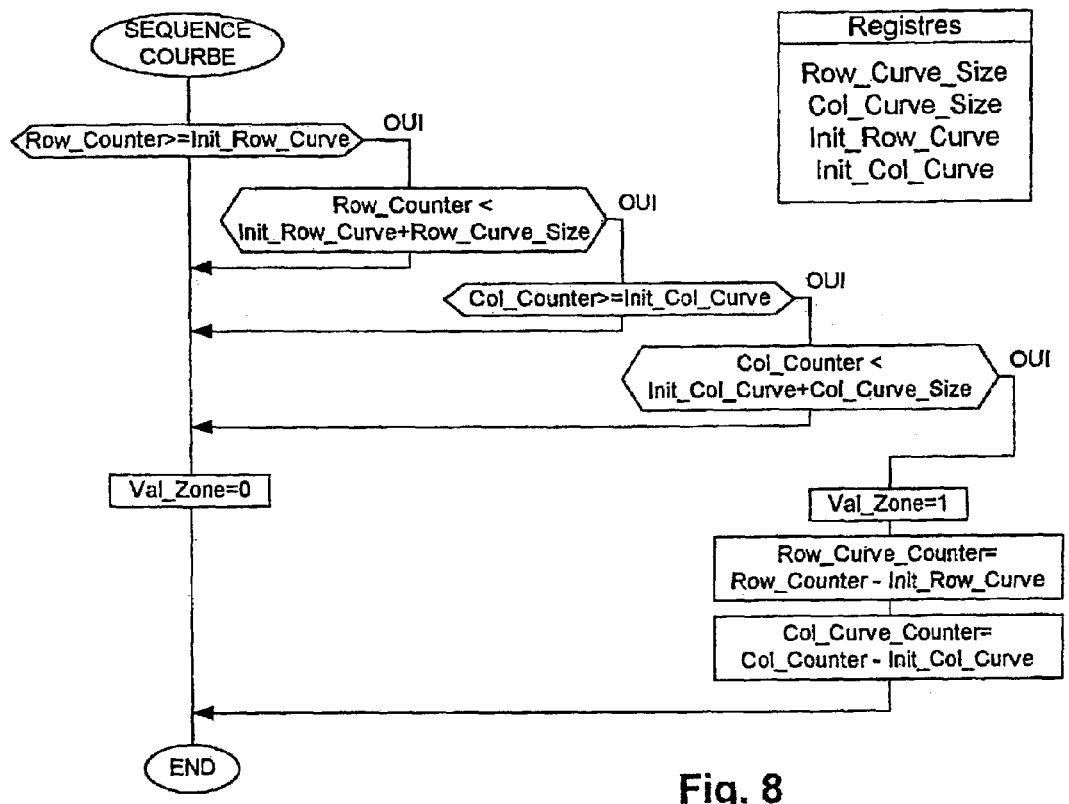
FIG. 8 is the flow chart of the insertion software of the curve zone.
Figure 9:
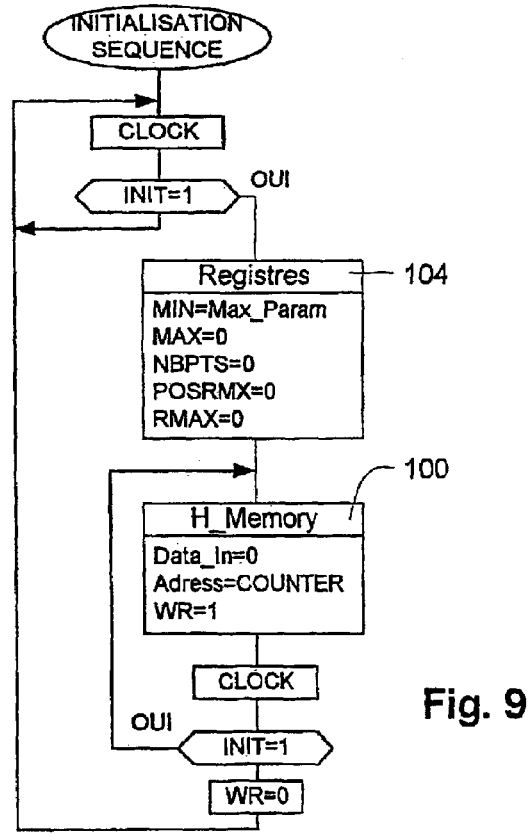
FIG. 9 is the flow chart of the initialisation software (generation of the command 'INIT')
Figure 10:
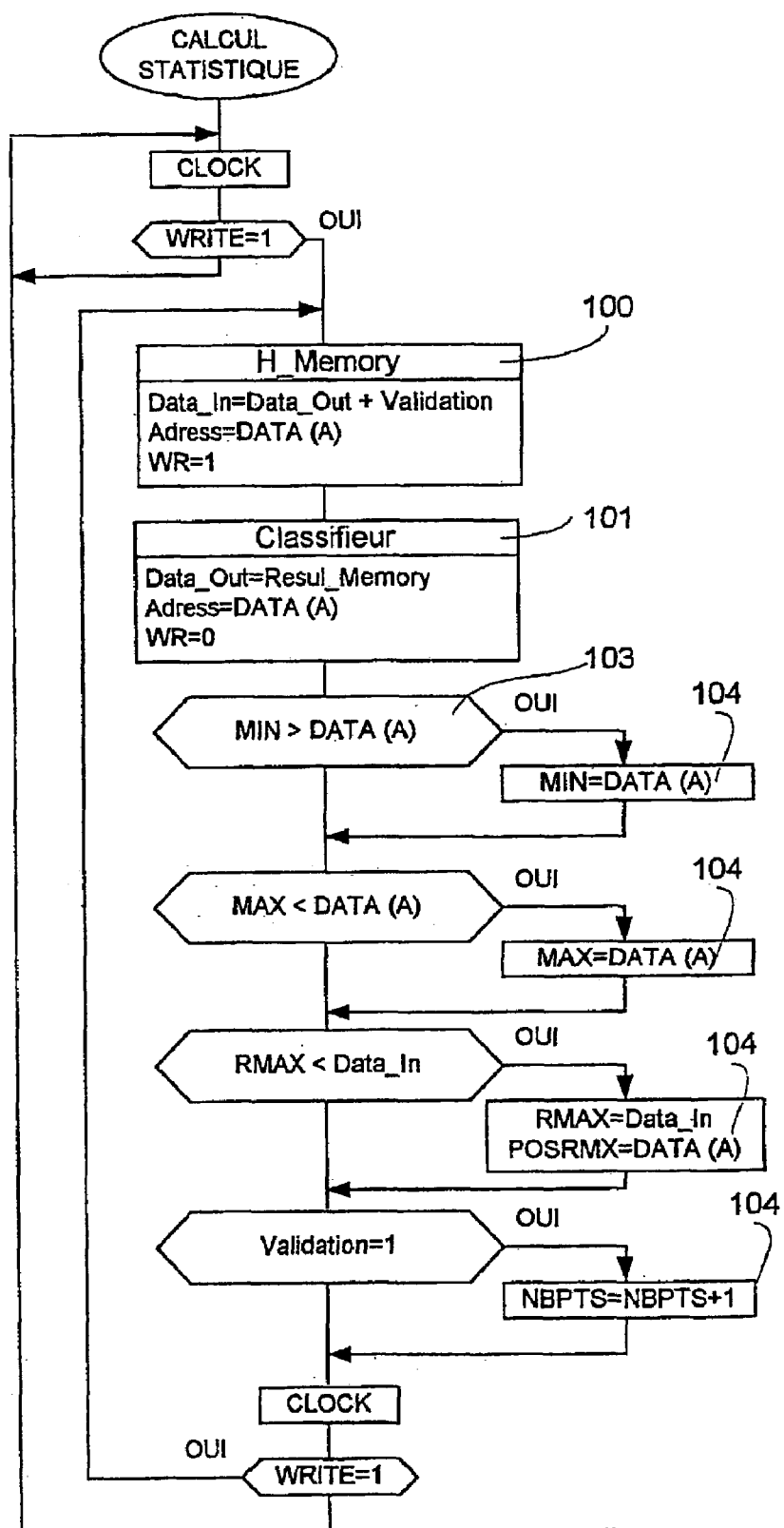
FIG. 10 is the flow chart of the statistical calculation software (use of the command 'WRITE')

GETPC:

Role: To collect information from the PC.
Parameters: None.
Prototype:
    GETPC
    Input-
    Output-   R0:   Information FIG. 1
PREVIOUS ART
FIG. 3
VALIDATION = ENABLING
FIG. 6
DEPART MAITRE = START MASTER
Registres = registers
FIG. 7
Séquence courbe: curve sequence
FIG. 9
INITIALISATION SEQUENCE: SEQUENCE INITIALISATION
FIG. 10
CALCUL STATISTIQUE: STATISTICAL CALCULATION
Classifier 101

APPENDIX A-continued

Figure 21:
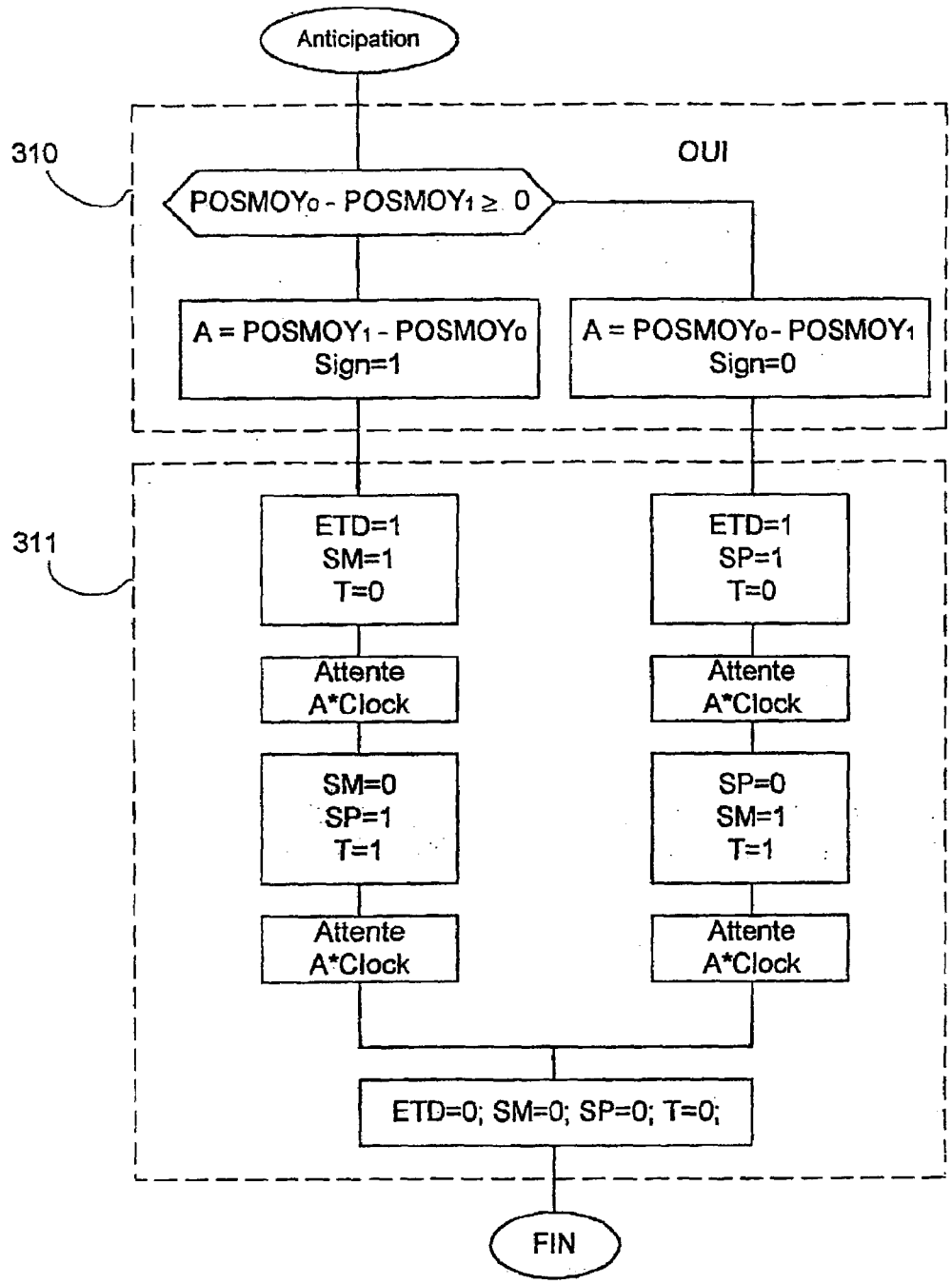
FIG. 21 is the flow chart of the anticipation implementation software.

FIG. 11
FIN SEQUENCE: END OF SEQUENCE
Mise á jour du classifieur: Updating the classifier
Nouveau calcul de POSMOY: new calculation of POSMOY
FIG. 13
CHOIX: CHOICE
SEUIL: THRESHOLD
FIG. 13c
Borne: terminal
FIG. 21
Attente: standby
FIG. 40
Apprentissage: learning
Classification automatique: automatic classification

The invention claimed is:

1. An automatic visual perception device for an even occurring in a space with respect to at least one digitized parameter, comprising at least two histogram calculation units for the treatment of the at least one parameter a control unit, a data bus, a time coincidences bus carrying at least a time coincidences signal, the histogram calculation unit being configured to form a histogram representative of the parameter in function of a validation signal and to determine by classification a binary classification signal resulting from the comparison of the parameter and a selection criterion C, wherein the classification signal is sent to the time coincidences bus, and wherein the validation signal is produced from time coincidences signals from the time coincidence bus so that the calculation of the histogram depends on the classification signals carried by the time coincidence bus, and wherein the histogram calculation units process data $a_{ijt}$ associated with pixels forming together a multidimensional space (i,j) evolving with the course of time and represented at a succession of instants (T), wherein said data reaches said calculation unit in the form of a digital signal DATA(A) in the form of a succession $a_{ijt}$ of binary numbers of n bits associated with synchronization signals enabling to define the given instant (T) of the space and the position (i,j) of the pixel in this space, to which the signal $a_{ijt}$ received at a given instant (T) is associated, said unit comprising:

an analysis memory including a memory with addresses, each address associated with possible values of the number of n bits of the signal DATA(A) and whose writing process is controlled by a WRITE signal;

a classifier comprising a memory intended for receiving a selection criterion C of the parameter DATA(A), said classifier receiving the signal DATA(A) at the input and outputting a binary output signal whereof the value depends on the result of the comparison of the signal DATA (A) with the selection criterion C, a time coincidences unit that receives signals from the time coincidence bus, said time coincidences unit outputs a positive global enabling signal when the time coincidences signals are valid, a test unit, an analysis output unit, an address multiplexer, an incrementation enabling unit wherein the counter of each address in the memory corresponds to the value (d) of $a_{ijt}$ at a given instant, which is incremented by one unit when the time coincidences unit outputs a positive global, enabling signal, the test unit intended for calculating and storing statistical data processes, after receiving the data $a_{ijt}$ corresponding to the space at an instant (T), the content of the memory in order to update the analysis output unit, wherein the memory is deleted before the beginning of each frame for a space at an instant (T) by an initialization signal "INIT", and wherein:

the memory of the classifier is an addressable memory enabling real time updating of the selection criterion (C) and having a data input DATA IN, an address command ADDRESS and a writing command WR, receiving on its input the output from the analysis memory and a signal END on its writing command, the histogram processing units further comprise a data input multiplexer with two inputs and one output, receiving on one of its inputs a counting signal COUNTER and on its other input, the succession of data $a_{ijt}$ and outputting the succession of data $a_{ijt}$ to the address command of the memory of the classifier and an operator OR controlling the address multiplexer and receiving on its inputs an initialization signal INIT and the end signal END.

2. An automatic visual perception device according to claim 1, further comprising, to process several parameters, several histogram calculation units organized into a matrix, wherein each of the calculation units is connected to the data and time coincidences buses.

3. An automatic visual perception device according to claim 1, wherein the space (i,j) is two-dimensional and in that the signal DATA(A) is associated with the pixels of a succession of images.

4. An automatic visual perception device according to claim 1, wherein the histogram processing units comprise means for anticipating the value of the classification criterion (C).

5. An automatic visual perception device according to claim 4, wherein the means for anticipating the value of the classification criterion (C) comprise memories intended for containing the values of statistical parameters relating to two successive frames ($T_0$ and $T_1$).

6. An automatic visual perception device according to claim 5, wherein the statistical parameters are the average values of the data $a_{ijt}$ enabled.

7. An automatic visual perception device according to claim 1, wherein the analysis output register of the histogram calculation units constitutes and stores in its memory at least one of the following values: the minimum 'MIN', the maximum 'MAX', the maximum number of pixels for which the signal $V_{ijt}$ has a particular value 'RMAX', the particular value corresponding POSRMAX, and the total number of enabled pixels 'NBPTS'.

8. An automatic visual perception device according to claim 1, wherein the statistical comparison parameter used by the classifier is RMAX/2.

9. An automatic visual perception device according to claim 1, further comprising a controlled multiplexer, configured to receive at input several statistical parameters and in that the comparison made by the classifier depends on a command issued by this multiplexer.

10. An automatic visual perception device according to claim 1, wherein in certain histogram calculation units, at least, a learning multiplexer configured to receive an external command signal and to initiate an operation according to a learning mode wherein the registers of the classifier and of the time coincidences unit are erased when starting to process a frame, and wherein the analysis output register supplies values typical of the sequence of each of these registers.

11. An automatic visual perception device according to claim 1, wherein in certain histogram calculation units, at least the memory of the classifier includes a set of independent registers (D), each comprising one input, one output and one writing command, wherein the number of these registers (D) is equal to the number n of bits of the numbers of the succession $V_{ijt}$, and in that it comprises a decoder configured to output a writing command signal corresponding to the related input value (address) and a multiplexer controlled by this input value, thus enabling to read the chosen register.

12. An automatic visual perception device according to claim 1, wherein certain histogram calculation units at least, comprise multiplexers, one of them being associated with the input of each register, and combinatory modules connecting the registers to one another, wherein the multiplexers are configured to choose between a sequential writing mode and a writing mode common to all registers connected together by the combinatory modules.

13. An automatic visual perception device according to claim 12, wherein in certain histogram calculation units at least, the combinatory modules comprise a morphological expansion operator including a three-input logic unit 'OR', wherein the first input unit receives the output signal of the 'Q'-order register, wherein the second input unit is connected to the output of a two-input logic unit 'AND' receiving respectively the output signal of the 'Q+1'-order register and a positive expansion signal, and wherein the third input unit is connected to the output of a two-input logic unit 'AND' receiving respectively the output signal of the 'Q-1'-order register and a negative expansion signal.

14. An automatic visual perception device according to claim 13, wherein in certain histogram calculation units at least, the combinatory modules comprise a morphological erosion operator including a three-input logic unit 'AND', wherein the first input unit receives the output signal of the 'Q'-order register, wherein the second input unit is connected to the output of a logic unit 'AND', wherein one four-input reverse receives respectively the output signal of the 'Q'-order register, the output signal of the 'Q-1'-order register, the output signal of the 'Q+1'-order register and a positive erosion signal, and wherein the third input unit is connected to the output of a four-input logic unit 'AND', wherein one reverse receives respectively the output signal of the 'Q'-order register, the output signal of the 'Q-1'-order register, the output signal of the 'Q+1'-order register and a negative erosion signal.

15. An automatic visual perception device according to any of the claims 13 and claim 14, wherein in certain histogram calculation units at least, each combinatory module comprises a multiplexer associating a morphological expansion operator and a morphological erosion operator.

16. Histogram calculation unit as implemented in the automatic visual perception device according to claim 1.

17. A method for automatic perception of an event occurring in a space with respect to at least one parameter, comprising digitizing the parameter, characterized in that said parameter is transmitted under control of a control unit via a data bus to at least one histogram calculation unit, the histogram calculation unit calculating a histogram representative of the parameter as a function of a validation signal and determining by classification a binary classification signal resulting form the comparison of the parameter and a selection criterion C, wherein the classification signal is sent to a time coincidences bus, wherein the classification signals of the time coincidences bus are used to generate the validation signal in order to make the calculation of the histogram depend on the classification signals carried by the time coincidence bus, and calculating a histogram over data $a_{ijt}$ associated with pixels forming together a multidimensional space (i,j) evolving with the course of time and represented at a succession of instants (T), wherein said data reaches said calculation unit in the form of a digital signal DATA(A) in the form of a succession $a_{ijt}$ of binary number of n bits associated with synchronization signals enabling to define the given instant (T) of the space and the position of the pixel (i,j) in this space, to which the signal $a_{ijt}$ received at a given instant (t) is associated, wherein:

to each data $a_{ijt}$ is associated a classification binary signal whereof the value depends on the result of the comparison between the signal DATA(A) and the selection criterion C, a statistical distribution of the data $a_{ijt}$ is made for a given instant (T) for which a global enabling signal is positive, said global enabling signal being made of a set of individual time coincidences signals, each one corresponding to a parameter DATA(A), DATA (B), ..., DATA(E), resulting from the comparison between a time coincidences criterion R and the classification signal and being positive.

18. A method according to claim 17, wherein the event is represented by several parameters and wherein the result is derived from several histogram calculation units organized into a matrix, wherein each of the calculation units is connected to the data and times coincidences buses.

19. A method for analyzing a parameter according to claim 17, wherein the space (i,j) is two-dimensional and in that the signal DATA(A) is associated with the pixels of a succession of images.

20. An analysis method of a parameter according to claim 19, wherein updating the classification criterion (C) is anticipated.

21. An analysis method of a parameter according to claim 20, wherein anticipating the update of the classification criterion (C) results from successive applications of an expansion operator and of an erosion operator, each of them, a number of times and in a direction depending on the evolution of the average of the parameter $a_{ijt}$ validated between two successive frames ($T_0$ and $T_1$).

22. An analysis method of a parameter according to claim 17, wherein the classification criterion (C) is updated, in real time, in relation to the statistical distribution.

23. An analysis method of a parameter according to claim 22, wherein updating the classification criterion (C) depends on the evolution of the average of the parameter $a_{ijt}$ enables between two successive frames ($T_0$ and $T_1$).

24. An analysis method of a parameter according to claim 17, wherein the time coincidences criterion (R) is complex.

25. An analysis method of a parameter according to claim 17, wherein the coincidences criterion (R) is automatically proposed next to a learning step.

* * * * *